United States Patent
Liu et al.

(10) Patent No.: US 12,494,744 B2
(45) Date of Patent: Dec. 9, 2025

(54) SIGNAL PROCESSING METHOD AND SIGNAL PROCESSING APPARATUS

(71) Applicant: HUAWEI TECHNOLOGIES CO., LTD., Guangdong (CN)

(72) Inventors: Qiao Liu, Chengdu (CN); Zhi Zhou, Chengdu (CN); Qianfu Cheng, Chengdu (CN); Hua Cai, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/416,149

(22) Filed: Jan. 18, 2024

(65) Prior Publication Data
US 2024/0171127 A1 May 23, 2024

Related U.S. Application Data

(63) Continuation of application No. PCT/CN2022/106687, filed on Jul. 20, 2022.

(30) Foreign Application Priority Data

Jul. 20, 2021 (CN) .......................... 202110819484.2

(51) Int. Cl.
*H03F 1/02* (2006.01)
*H03F 3/24* (2006.01)
*H04B 1/04* (2006.01)

(52) U.S. Cl.
CPC .......... *H03F 1/0233* (2013.01); *H03F 3/245* (2013.01); *H04B 1/04* (2013.01); *H03F 2200/105* (2013.01); *H03F 2200/451* (2013.01)

(58) Field of Classification Search
CPC ..... H03F 1/02; H03F 1/30; H03F 1/32; H03F 1/0233; H03F 3/19; H03F 3/21;
(Continued)

(56) References Cited

U.S. PATENT DOCUMENTS 10,778,345 B2 * 9/2020 El-Hassan ............... H04L 5/001
12,051,999 B2 * 7/2024 Drogi ..................... H03F 1/304
(Continued)

FOREIGN PATENT DOCUMENTS

CN 1790920 A 6/2006

OTHER PUBLICATIONS

Analog Devices, RF Predistortion Ics, [online], https://www.maximintegrated.com/en/products/comms/wireless-rf/rf-predistorters/predistortion-linearization/rfpal-technology/rfpd-vs-dpd.html, Dec. 2024, total 3 pages.

*Primary Examiner* — Shawkat M Ali
(74) *Attorney, Agent, or Firm* — Rimon PC

(57) ABSTRACT

A signal processing apparatus includes a power amplifier and a power supply modulator. The signal processing apparatus obtains a first non-linear coefficient, where the first non-linear coefficient indicates a non-linear characteristic of the power amplifier and a non-linear characteristic of the power supply modulator. The signal processing apparatus performs non-linear preprocessing and correction on a first baseband signal based on the first non-linear coefficient, to obtain a first intermediate signal and a second intermediate signal. The signal processing apparatus performs digital-to-analog conversion on the first intermediate signal and then performs up-conversion processing, to obtain a third intermediate signal. The signal processing apparatus performs envelope processing on the second intermediate signal, to obtain a first envelope signal. The signal processing apparatus modulates the first envelope signal by using the power supply modulator, to obtain a first control voltage signal.

20 Claims, 11 Drawing Sheets

(58) Field of Classification Search
CPC ... H03F 3/24; H03F 3/38; H03F 3/245; H04B 1/04; H04B 1/16; H04B 1/38; H04B 1/62; H04B 1/66; H04B 17/13; H04L 25/03; H04L 25/49; H04L 27/36; H04W 24/06; H04W 52/02; H04W 52/52
USPC ........ 375/219, 295–297, 285, 308; 455/90.2, 455/102, 114.3, 127.2, 127.5, 230
See application file for complete search history.

(56) References Cited

U.S. PATENT DOCUMENTS

| | | | |
|---|---|---|---|
| 2015/0333781 A1* | 11/2015 | Alon | H03F 1/3247 370/310 |
| 2020/0295790 A1* | 9/2020 | Langer | H03F 1/0222 |
| 2020/0366247 A1* | 11/2020 | Ho | H03F 1/0233 |

* cited by examiner

SIGNAL PROCESSING METHOD AND SIGNAL PROCESSING APPARATUS

CROSS-REFERENCE TO RELATED APPLICATIONS

This application is a continuation of International Application No. PCT/CN2022/106687, filed on Jul. 20, 2022, which claims priority to Chinese Patent Application No. 202110819484.2, filed on Jul. 20, 2021. The disclosures of the aforementioned applications are hereby incorporated by reference in their entireties.

TECHNICAL FIELD

This application relates to the field of communication technologies, and in particular, to a signal processing method and a signal processing apparatus.

BACKGROUND

With the development of wireless communication technologies, complex higher-order modulation and multiplexing methods have been widely adopted in a current communication systems to improve spectrum utilization, for example, an orthogonal frequency division multiplexing (OFDM) multi-carrier system. As a result, a signal will have a high peak-to-average power ratio. In this case, a power amplifier needs to work in a rollback region to ensure a linear index.

Currently, an envelope signal is modulated by using an envelope tracing technology in which a power supply modulator (for example, a dynamic power supply modulator) modulates a strategy, to obtain a control voltage signal. The control voltage signal is input into the power amplifier, to enable the power amplifier to work in a gain compression state in most cases. This effectively reduces the energy dissipation of the power amplifier, and effectively improves the efficiency of the power amplifier. However, the power supply modulator causes a corresponding non-linear characteristic. As a result, non-linear distortion of the signal output by the power amplifier can occur. How to resolve a problem of the non-linear distortion of the signal that is caused by the non-linear characteristic of the power supply modulator is worth considering.

SUMMARY

Embodiments of this application provide a signal processing method and a signal processing apparatus, to compensate for non-linear distortion of a signal that is caused by a non-linear characteristic of a power supply modulator and a non-linear characteristic of a power amplifier, to enable the power amplifier to work in a non-linear region. This improves efficiency of the power amplifier.

A first aspect of embodiments of this application provides a signal processing method. The method includes:

The signal processing apparatus obtains a first non-linear coefficient, where the first non-linear coefficient indicates a non-linear characteristic of a power amplifier and a non-linear characteristic of a power supply modulator. Then, the signal processing apparatus performs preprocessing and correction on a first baseband signal based on the first non-linear coefficient, to obtain a first intermediate signal and a second intermediate signal. The signal processing apparatus performs digital-to-analog conversion on the first intermediate signal and then performs up-conversion processing, to obtain a third intermediate signal. The signal processing apparatus performs envelope processing on the second intermediate signal, to obtain a first envelope signal. The signal processing apparatus performs the digital-to-analog conversion on the first envelope signal and then performs envelope amplification processing, to obtain a second envelope signal. The signal processing apparatus modulates the second envelope signal by using the power supply modulator, to obtain a first control voltage signal. The signal processing apparatus inputs the third intermediate signal and the first control voltage signal into the power amplifier, to obtain a first output signal.

In the foregoing technical solutions, the signal processing apparatus obtains the first non-linear coefficient, and performs the preprocessing and correction on the first baseband signal based on the first non-linear coefficient. The first non-linear coefficient indicates the non-linear characteristic of the power amplifier and the non-linear characteristic of the power supply modulator. The signal processing apparatus may compensate, by using the first non-linear coefficient, for non-linear distortion of a signal that is caused by the non-linear characteristic of the power supply modulator and the non-linear characteristic of the power amplifier, to enable the power amplifier to work in a non-linear region. When the power amplifier uses the same input power, if the non-linear distortion of the signal is not compensated, the power amplifier works in a linear region, and the output power is low. However, the signal processing apparatus compensates for the non-linear distortion of the signal by using the first non-linear coefficient. The power amplifier may work in the non-linear region, and the output power of the power amplifier is high. This improves the efficiency of the power amplifier.

In a possible implementation, the first non-linear coefficient indicates a first non-linear characteristic of the power amplifier in a first working state and a second non-linear characteristic of the power supply modulator in a second working state.

The signal processing apparatus modulates the first envelope signal by using the power supply modulator, to obtain the first control voltage signal, to enable the power supply modulator to be in a third working state. The signal processing apparatus inputs the third intermediate signal and the first control voltage signal into the power amplifier, to obtain the first output signal, to enable the power amplifier to be in a fourth working state.

An error between a total non-linear characteristic of a third non-linear characteristic of the power supply modulator in the third working state and a fourth non-linear characteristic of the power amplifier in the fourth working state and a total non-linear characteristic of the first non-linear characteristic and the second non-linear characteristic that is indicated by the first non-linear coefficient is less than or equal to a first threshold.

In the foregoing implementation, the signal processing apparatus effectively compensates, by using the first non-linear coefficient, for the non-linear distortion of the signal that is caused by the non-linear characteristic of the power supply modulator and the non-linear characteristic of the power amplifier, to enable the power amplifier to work in the non-linear region. This further improves the efficiency of the power amplifier.

In another possible implementation, that the signal processing apparatus obtains a first non-linear coefficient includes:

The signal processing apparatus determines the first non-linear coefficient based on a second baseband signal, a second output signal, a second envelope signal, and a second control voltage signal.

The second output signal is a signal obtained by inputting a fourth intermediate signal and the second control voltage signal into the power amplifier, to enable the power amplifier to be in the first working state.

The fourth intermediate signal is obtained by performing the digital-to-analog conversion on a fifth intermediate signal and then performing the up-conversion processing.

The second envelope signal is a signal obtained by performing envelope shaping processing on a sixth intermediate signal.

The second control voltage signal is a signal obtained by modulating a third envelope signal by using the power supply modulator, where the power supply modulator is in the second working state, and the third envelope signal is a signal obtained by performing analog-to-digital conversion on the second envelope signal and then performing envelope amplification processing.

The fifth intermediate signal and the sixth intermediate signal each are intermediate signals obtained by performing the preprocessing and correction on the second baseband signal based on a second non-linear coefficient, where the second non-linear coefficient indicates a fifth non-linear characteristic of the power amplifier in a fifth working state and a sixth non-linear characteristic of the power supply modulator in a sixth working state.

In the foregoing technical solutions, a method for obtaining the first non-linear coefficient is provided. This provides a foundation for implementing solutions. Then, the signal processing apparatus determines the first non-linear coefficient based on the second baseband signal, the second output signal, the second envelope signal, and the second control voltage signal. Therefore, the first non-linear coefficient can indicate the non-linear characteristic of the power amplifier and the non-linear characteristic of the power supply modulator. In this way, the signal processing apparatus may compensate, by using the first non-linear coefficient, for the non-linear distortion of the signal that is caused by the non-linear characteristic of the power supply modulator and the non-linear characteristic of the power amplifier, to enable the power amplifier to work in the non-linear region. This improves the efficiency of the power amplifier.

In another possible implementation, the method further includes: The signal processing apparatus obtains a pre-adjustment parameter.

That the signal processing apparatus performs envelope processing on the second intermediate signal, to obtain a first envelope signal includes:

The signal processing apparatus performs envelope shaping processing on the second intermediate signal, to obtain a fifth envelope signal.

The signal processing apparatus performs pre-adjustment processing on the fifth envelope signal based on the pre-adjustment parameter, then performs digital-to-analog conversion processing, and then performs the envelope amplification processing, to obtain the first envelope signal.

In the foregoing technical solutions, the signal processing apparatus performs the pre-adjustment processing on the fifth envelope signal based on the pre-adjustment parameter, to remove glitches of the fifth envelope signal. In this way, an envelope output of the fifth envelope signal obtained after the pre-adjustment processing is smoother. Then, the signal processing apparatus performs the digital-to-analog conversion processing on the fifth envelope signal obtained after the pre-adjustment processing and then performs the envelope amplification processing, to obtain the first envelope signal.

In another possible implementation, that the signal processing apparatus obtains a pre-adjustment parameter includes:

The signal processing apparatus determines the pre-adjustment parameter based on the second baseband signal, the second output signal, the second envelope signal, and the second control voltage signal.

The second output signal is the signal obtained by inputting the fourth intermediate signal and the second control voltage signal into the power amplifier, to enable the power amplifier to be in the first working state.

The fourth intermediate signal is obtained by performing the digital-to-analog conversion on the fifth intermediate signal and then performing the up-conversion processing.

The second envelope signal is the signal obtained by performing the envelope shaping processing on the sixth intermediate signal.

The second control voltage signal is the signal obtained by modulating the third envelope signal by using the power supply modulator, where the power supply modulator is in the second working state, and the third envelope signal is the signal obtained by performing the analog-to-digital conversion on the second envelope signal and then performing the envelope amplification processing.

The fifth intermediate signal and the sixth intermediate signal each are intermediate signals obtained by performing the preprocessing and correction on the second baseband signal based on the second non-linear coefficient, where the second non-linear coefficient indicates the fifth non-linear characteristic of the power amplifier in the fifth working state and the sixth non-linear characteristic of the power supply modulator in the sixth working state.

The foregoing implementation provides a manner of obtaining the pre-adjustment parameter. In this way, the signal processing apparatus performs the pre-adjustment processing on the fifth envelope signal based on the pre-adjustment parameter, to remove the glitches of the fifth envelope signal.

In another possible implementation, before that the signal processing apparatus performs pre-adjustment processing on the fourth envelope signal based on the pre-adjustment parameter, to obtain the first envelope signal, the method further includes: The signal processing apparatus determines that the first parameter is greater than or equal to a second threshold, where the first parameter is obtained based on the second baseband signal, the second output signal, the second envelope signal, and the second control voltage signal.

In the foregoing technical solutions, the signal processing apparatus first determines that the first parameter is greater than the second threshold, and then performs the pre-adjustment processing on the fourth envelope signal based on the pre-adjustment parameter. Therefore, the signal processing apparatus performs the pre-adjustment processing when the glitches of the fifth envelope signal need to be removed, to prevent the signal processing apparatus from performing some unnecessary operations.

In another possible implementation, the method further includes:

The signal processing apparatus determines a first delay value and a second delay value.

The signal processing apparatus simultaneously obtains the second baseband signal and the second output signal based on the first delay value, and simultaneously obtains the third envelope signal and the second control voltage signal based on the second delay value.

In this possible implementation, the signal processing apparatus may simultaneously obtain the second baseband signal and the second output signal based on the first delay value, and simultaneously obtain the third envelope signal and the second control voltage signal based on the second delay value. In this way, the signal processing apparatus obtains the non-linear characteristic of the power amplifier in the first working state and the non-linear characteristic of the power supply modulator in the second working state. In this way, the signal processing apparatus may compensate, by using the first non-linear coefficient, for the non-linear distortion of the signal that is caused by the non-linear characteristic of the power supply modulator and the non-linear characteristic of the power amplifier, to enable the power amplifier to work in the non-linear region. This improves the efficiency of the power amplifier.

In another possible implementation, the method further includes: The signal processing apparatus sends the first output signal. The first output signal is a signal output by using a signal processing procedure provided in this application. The power amplifier may work in the non-linear region. This improves the efficiency of the power amplifier.

A second aspect of embodiments of this application provides a signal processing apparatus, where the signal processing apparatus includes a power amplifier and a power supply modulator, and the signal processing apparatus includes:

a processing module, configured to: obtain a first non-linear coefficient, where the first non-linear coefficient indicates a non-linear characteristic of the power amplifier and a non-linear characteristic of the power supply modulator; perform non-linear preprocessing and correction on a first baseband signal based on the first non-linear coefficient, to obtain a first intermediate signal and a second intermediate signal; perform digital-to-analog conversion on the first intermediate signal and then performing up-conversion processing, to obtain a third intermediate signal; perform envelope processing on the second intermediate signal, to obtain a first envelope signal; modulate the first envelope signal by using the power supply modulator, to obtain a first control voltage signal; and input the third intermediate signal and the first control voltage signal into the power amplifier, to obtain a first output signal.

In a possible implementation, the first non-linear coefficient indicates a first non-linear characteristic of the power amplifier in the first working state and a second non-linear characteristic of the power supply modulator in the second working state.

The signal processing apparatus modulates the first envelope signal by using the power supply modulator, to obtain the first control voltage signal, to enable the power supply modulator to be in a third working state. The signal processing apparatus inputs the third intermediate signal and the first control voltage signal into the power amplifier, to obtain the first output signal, to enable the power amplifier to be in a fourth working state.

An error between a total non-linear characteristic of a third non-linear characteristic of the power supply modulator in the third working state and a fourth non-linear characteristic of the power amplifier in the fourth working state and a total non-linear characteristic of the first non-linear characteristic and the second non-linear characteristic that is indicated by the first non-linear coefficient is less than or equal to a first threshold.

In a possible implementation, the processing module is specifically configured to:
determine the first non-linear coefficient based on a second baseband signal, a second output signal, a second envelope signal, and a second control voltage signal.

The second output signal is a signal obtained by inputting a fourth intermediate signal and the second control voltage signal into the power amplifier, to enable the power amplifier to be in the first working state.

The fourth intermediate signal is obtained by performing the digital-to-analog conversion on a fifth intermediate signal and then performing the up-conversion processing.

The second envelope signal is a signal obtained by performing envelope shaping processing on a sixth intermediate signal.

The second control voltage signal is a signal obtained by modulating a third envelope signal by using the power supply modulator, where the power supply modulator is in the second working state, and the third envelope signal is a signal obtained by performing analog-to-digital conversion on the second envelope signal and then performing envelope amplification processing.

The fifth intermediate signal and the sixth intermediate signal each are an intermediate signal obtained by performing the preprocessing and correction on the second baseband signal based on a second non-linear coefficient, where the second non-linear coefficient indicates a fifth non-linear characteristic of the power amplifier in a fifth working state and a sixth non-linear characteristic of the power supply modulator in a sixth working state.

In another possible implementation, the processing module is further configured to:
obtain a pre-adjustment parameter.

The processing unit is specifically configured to:
perform the envelope shaping processing on the second intermediate signal, to obtain a fifth envelope signal; and
perform pre-adjustment processing on the fifth envelope signal based on the pre-adjustment parameter, then perform digital-to-analog conversion processing, and then perform the envelope amplification processing, to obtain the first envelope signal.

In another possible implementation, the processing module is specifically configured to:
determine the pre-adjustment parameter based on the second baseband signal, the second output signal, the second envelope signal, and the second control voltage signal.

The second output signal is the signal obtained by inputting the fourth intermediate signal and the second control voltage signal into the power amplifier, to enable the power amplifier to be in the first working state.

The fourth intermediate signal is obtained by performing the digital-to-analog conversion on the fifth intermediate signal and then performing the up-conversion processing.

The second envelope signal is the signal obtained by performing the envelope shaping processing on the sixth intermediate signal.

The second control voltage signal is the signal obtained by modulating the third envelope signal by using the power supply modulator, where the power supply modulator is in the second working state, and the third envelope signal is the signal obtained by performing the analog-to-digital conversion on the second envelope signal and then performing the envelope amplification processing.

The fifth intermediate signal and the sixth intermediate signal each are intermediate signals obtained by performing the preprocessing and correction on the second baseband signal based on the second non-linear coefficient, where the second non-linear coefficient indicates the fifth non-linear characteristic of the power amplifier in the fifth working state and the sixth non-linear characteristic of the power supply modulator in the sixth working state.

In another possible implementation, the processing module is further configured to: determine that a first parameter is greater than a second threshold, where the first parameter is obtained based on the second baseband signal, the second output signal, the second envelope signal, and the second control voltage signal.

In another possible implementation, the processing module is further configured to: determine a first delay value and a second delay value; and simultaneously obtain the second baseband signal and the second output signal based on the first delay value, and simultaneously obtain the third envelope signal and the second control voltage signal based on the second delay value.

In another possible implementation, the signal processing apparatus further includes a transceiver module.

The transceiver module is configured to send the first output signal.

A third aspect of embodiments of this application provides a signal processing apparatus. The signal processing apparatus includes a processor, a power amplifier, and a power supply modulator. The processor is configured to invoke and run the computer program stored in a memory, to enable the processor to implement any implementation of the first aspect.

Optionally, the signal processing apparatus further includes the memory, and the processor is connected to the memory.

Optionally, the signal processing apparatus further includes a transceiver, and the processor is further configured to control the transceiver to receive and transmit the signal.

A fourth aspect of the embodiments of this application provides a signal processing apparatus, where the signal processing apparatus includes a logic circuit, and the logic circuit includes a power amplifier and a power supply modulator.

The logic circuit is configured to: obtain a first non-linear coefficient, where the first non-linear coefficient indicates a non-linear characteristic of the power amplifier and a non-linear characteristic of the power supply modulator; perform non-linear preprocessing and correction on a first baseband signal based on the first non-linear coefficient, to obtain a first intermediate signal and a second intermediate signal; perform digital-to-analog conversion on the first intermediate signal and then perform up-conversion processing, to obtain a third intermediate signal; perform envelope processing on the second intermediate signal, to obtain a first envelope signal; modulate the first envelope signal by using the power supply modulator, to obtain a first control voltage signal; and input the third intermediate signal and the first control voltage signal into the power amplifier, to obtain a first output signal.

In a possible implementation, the first non-linear coefficient indicates a first non-linear characteristic of the power amplifier in a first working state and a second non-linear characteristic of the power supply modulator in a second working state.

The signal processing apparatus modulates the first envelope signal by using the power supply modulator, to obtain the first control voltage signal, to enable the power supply modulator to be in a third working state. The signal processing apparatus inputs the third intermediate signal and the first control voltage signal into the power amplifier, to obtain the first output signal, to enable the power amplifier to be in a fourth working state.

An error between a total non-linear characteristic of a third non-linear characteristic of the power supply modulator in the third working state and a fourth non-linear characteristic of the power amplifier in the fourth working state and a total non-linear characteristic of the first non-linear characteristic and the second non-linear characteristic that is indicated by the first non-linear coefficient is less than or equal to a first threshold.

In another possible implementation, the signal processing apparatus is specifically configured to:
  determine the first non-linear coefficient based on a second baseband signal, a second output signal, a second envelope signal, and a second control voltage signal.

The second output signal is a signal obtained by inputting a fourth intermediate signal and the second control voltage signal into the power amplifier, to enable the power amplifier to be in the first working state.

The fourth intermediate signal is obtained by performing the digital-to-analog conversion on a fifth intermediate signal and then performing the up-conversion processing.

The second envelope signal is a signal obtained by performing envelope shaping processing on a sixth intermediate signal.

The second control voltage signal is a signal obtained by modulating a third envelope signal by using the power supply modulator, where the power supply modulator is in the second working state, and the third envelope signal is a signal obtained by performing analog-to-digital conversion on the second envelope signal and then performing envelope amplification processing.

The fifth intermediate signal and the sixth intermediate signal each are an intermediate signal obtained by performing the preprocessing and correction on the second baseband signal based on a second non-linear coefficient, where the second non-linear coefficient indicates a fifth non-linear characteristic of the power amplifier in a fifth working state and a sixth non-linear characteristic of the power supply modulator in a sixth working state.

In another possible implementation, the signal processing apparatus is further configured to:
  obtain a pre-adjustment parameter.

The signal processing apparatus is specifically configured to:
  perform the envelope shaping processing on the second intermediate signal, to obtain a fifth envelope signal; and
  perform pre-adjustment processing on the fifth envelope signal based on the pre-adjustment parameter, then perform digital-to-analog conversion processing, and then perform the envelope amplification processing, to obtain the first envelope signal.

In another possible implementation, the signal processing apparatus is specifically configured to:
  determine the pre-adjustment parameter based on the second baseband signal, the second output signal, the second envelope signal, and the second control voltage signal.

The second output signal is the signal obtained by inputting the fourth intermediate signal and the second control voltage signal into the power amplifier, to enable the power amplifier to be in the first working state.

The fourth intermediate signal is obtained by performing the digital-to-analog conversion on the fifth intermediate signal and then performing the up-conversion processing.

The second envelope signal is the signal obtained by performing the envelope shaping processing on the sixth intermediate signal.

The second control voltage signal is the signal obtained by modulating the third envelope signal by using the power supply modulator, where the power supply modulator is in the second working state, and the third envelope signal is the signal obtained by performing the analog-to-digital conversion on the second envelope signal and then performing the envelope amplification processing.

The fifth intermediate signal and the sixth intermediate signal each are intermediate signals obtained by performing the preprocessing and correction on the second baseband signal based on the second non-linear coefficient, where the second non-linear coefficient indicates the fifth non-linear characteristic of the power amplifier in the fifth working state and the sixth non-linear characteristic of the power supply modulator in the sixth working state.

In another possible implementation, the signal processing apparatus is further configured to:
determine that a first parameter is greater than a second threshold, where the first parameter is obtained based on the second baseband signal, the second output signal, the second envelope signal, and the second control voltage signal.

In another possible implementation, the signal processing apparatus is further configured to:
determine a first delay value and a second delay value; and
simultaneously obtain the second baseband signal and the second output signal based on the first delay value, and simultaneously obtain the third envelope signal and the second control voltage signal based on the second delay value.

In another possible implementation, the signal processing apparatus further includes an input/output interface.

The input/output interface is configured to send the first output signal.

A fifth aspect of embodiments of this application provides a computer program product including instructions. When the computer program product runs on a computer, the computer is enabled to perform any implementation of the first aspect.

A sixth aspect of embodiments of this application provides a computer-readable storage medium, including computer instructions. When the computer instructions are run on a computer, the computer is enabled to perform any implementation of the first aspect.

A seventh aspect of embodiments of this application provides a chip apparatus, including a processor, configured to connect to a memory, and invoke a program stored in the memory, to enable the processor to perform any implementation of the first aspect.

It can be learned from the foregoing technical solutions that embodiments of this application have the following advantages:

It can be learned from the foregoing technical solutions that the signal processing apparatus obtains the first non-linear coefficient, where the first non-linear coefficient indicates the non-linear characteristic of the power amplifier and the non-linear characteristic of the power supply modulator. Then, the signal processing apparatus performs the preprocessing and correction on the first baseband signal based on the first non-linear coefficient, to obtain the first intermediate signal and the second intermediate signal. The signal processing apparatus performs the digital-to-analog conversion on the first intermediate signal and then performs the up-conversion processing, to obtain the third intermediate signal. The signal processing apparatus performs the envelope processing on the second intermediate signal, to obtain the first envelope signal. The signal processing apparatus performs the digital-to-analog conversion on the first envelope signal and then performs envelope amplification processing, to obtain the second envelope signal. The signal processing apparatus modulates the second envelope signal by using the power supply modulator, to obtain the first control voltage signal. The signal processing apparatus inputs the third intermediate signal and the first control voltage signal into the power amplifier, to obtain the first output signal. It can be learned that, in this application, the signal processing apparatus obtains the first non-linear coefficient, and performs the preprocessing and correction on the first baseband signal based on the first non-linear coefficient. The first non-linear coefficient indicates the non-linear characteristic of the power amplifier and the non-linear characteristic of the power supply modulator. The signal processing apparatus compensates for the non-linear distortion of the signal that is caused by the non-linear characteristic of the power supply modulator and the non-linear characteristic of the power amplifier, to enable the power amplifier to work in the non-linear region. This improves the efficiency of the power amplifier.

DESCRIPTION OF EMBODIMENTS

Figure 1A:
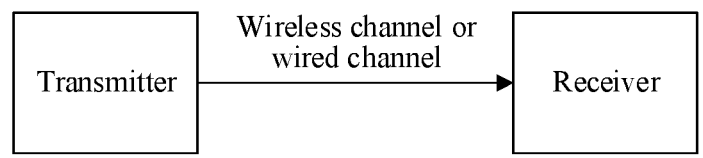
FIG. 1A is a schematic diagram of a communication system according to an embodiment of this application.

Embodiments of this application provide a signal processing method and a signal processing apparatus, to compensate for non-linear distortion of a signal that is caused by a non-linear characteristic of a power supply modulator and a non-linear characteristic of a power amplifier, to enable the power amplifier to work in a non-linear region. This improves efficiency of the power amplifier.

The following clearly and completely describes the technical solutions in embodiments of this application with reference to the accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

A communication system to which this application is applicable includes a fourth generation (4G) communication system, a fifth generation (5G) system or a new radio (NR) system, a long term evolution (LTE) system, an LTE frequency division duplex (FDD) system, an LTE time division duplex (TDD) system, a wireless-fidelity (Wi-Fi) system, a universal mobile telecommunications system (UMTS), a mobile communication system (for example, a 6G mobile communication system) after a 5G network, a vehicle to everything (V2X) communication system, a device to device (D2D) communication system, or the like.

The communication system to which this application is applicable may be a wireless communication system, or may be a wired communication system. This is not specifically limited in this application.

In a possible implementation, the communication system to which this application is applicable includes the signal processing apparatus. The signal processing apparatus includes the power amplifier and the power supply modulator. The signal processing apparatus may compensate, by using the signal processing method provided in this application, for non-linear distortion of a signal that is caused by the non-linear characteristic of the power supply modulator and the non-linear characteristic of the power amplifier. This improves the efficiency of the power amplifier. The signal processing apparatus may be a terminal device, a network device, an optical cable transmission device, a cable transmission device, or another device that uses the power amplifier to amplify signal power.

The following describes the terminal device and the network device in this application.

The terminal device may be a wireless terminal device that can receive scheduling information and indication information of the network device. The wireless terminal device may be a device that provides voice and/or data connectivity for a user, a handheld device having a wireless connection function, or another processing device connected to a wireless modem.

The terminal device, also referred to as user equipment (UE), a mobile station (MS), a mobile terminal (MT), and the like, is a device that includes a wireless communication function (providing the voice/data connectivity to the user), for example, the handheld device having the wireless connection function or an in-vehicle device. Currently, some examples of the terminal device are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in vehicle to everything, a wireless terminal in self driving, a wireless terminal in remote medical surgery, a wireless terminal in a smart grid, a wireless terminal in transportation safety, a wireless terminal in a smart city, a wireless terminal in a smart home, or the like. For example, the wireless terminal in the vehicle to everything may be an in-vehicle device, an entire vehicle device, an in-vehicle module, a vehicle, or the like. The wireless terminal in the industrial control may be a camera, a robot, or the like. The wireless terminal in the smart home can be a television, an air conditioner, a floor sweeper, a speaker, a set-top box, or the like.

The network device may be a device in a wireless network. For example, the network device is a device deployed in a radio access network to provide the wireless communication function for the terminal device. For example, the network device may be a radio access network (RAN) node that enables the terminal device to access the wireless network, and may also be referred to as an access network device.

The network device includes but is not limited to: an evolved NodeB (eNB), a radio network controller (RNC), a NodeB (NB), a base station controller (BSC), a base transceiver station (BTS), a home NodeB (for example, a home evolved NodeB, HNB), a baseband unit (BBU), an access point (AP) in a wireless-fidelity (Wi-Fi) system, a wireless relay node, a wireless backhaul node, a transmission point (TP), a transmission reception point (TRP), or the like, or may also be a network device in the 5G mobile communication system, for example, a next generation NodeB (gNB), a transmission reception point (TRP), and a transmission point (TP) in the new radio (NR) system, or one or one group (including a plurality of antenna panels) antenna panels of the base station in the 5G mobile communication system, or the network device may be a network node that forms the gNB or the transmission point, for example, a baseband unit (BBU), a distributed unit (DU), or the like.

FIG. 1A is a schematic diagram of a communication system according to an embodiment of this application. Refer to FIG. 1A. The communication system includes a transmitter and a receiver. Communication transmission is performed between the transmitter and the receiver through a wireless channel or a wired channel.

A signal processing apparatus may be the transmitter shown in FIG. 1A. For example, the transmitter may be a part of a network device or a part of a terminal device. In FIG. 1A, the wireless channel may be radio transmission of electromagnetic waves through a medium such as the atmosphere, a vacuum, or water. The wired channel may be transmission through a medium such as an optical fiber or a copper wire.

Figure 1B:
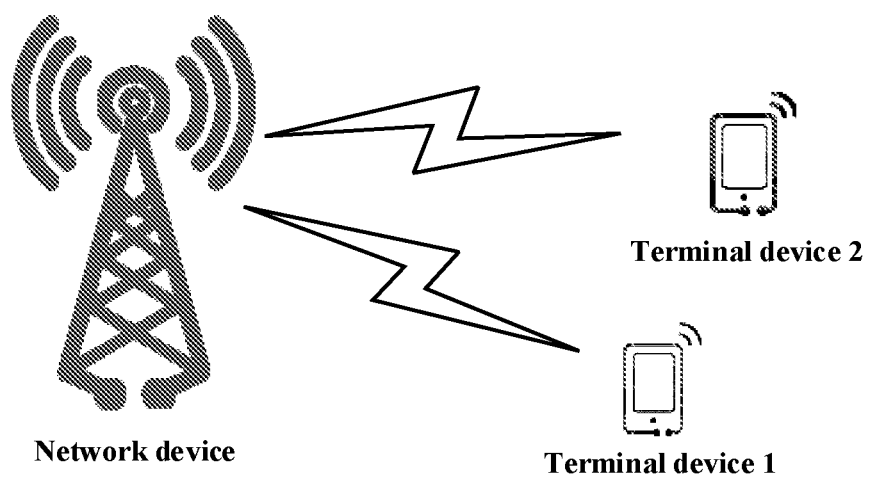
FIG. 1B is another schematic diagram of a communication system according to an embodiment of this application.

FIG. 1B is another schematic diagram of a communication system according to an embodiment of this application. Refer to FIG. 1B. The communication system includes a network device and a terminal device. Communication transmission is performed between the network device and the terminal device through a wireless channel.

A signal processing apparatus may be the network device or the terminal device shown in FIG. 1B.

The communication system shown in FIG. 1B includes one network device and two terminal devices. The two terminal devices are respectively a terminal device 1 and a terminal device 2. In actual application, the communication system includes at least one network device and at least one terminal device. This is not specifically limited in this application.

The following describes the technical solutions of this application with reference to specific embodiments.

Figure 2:
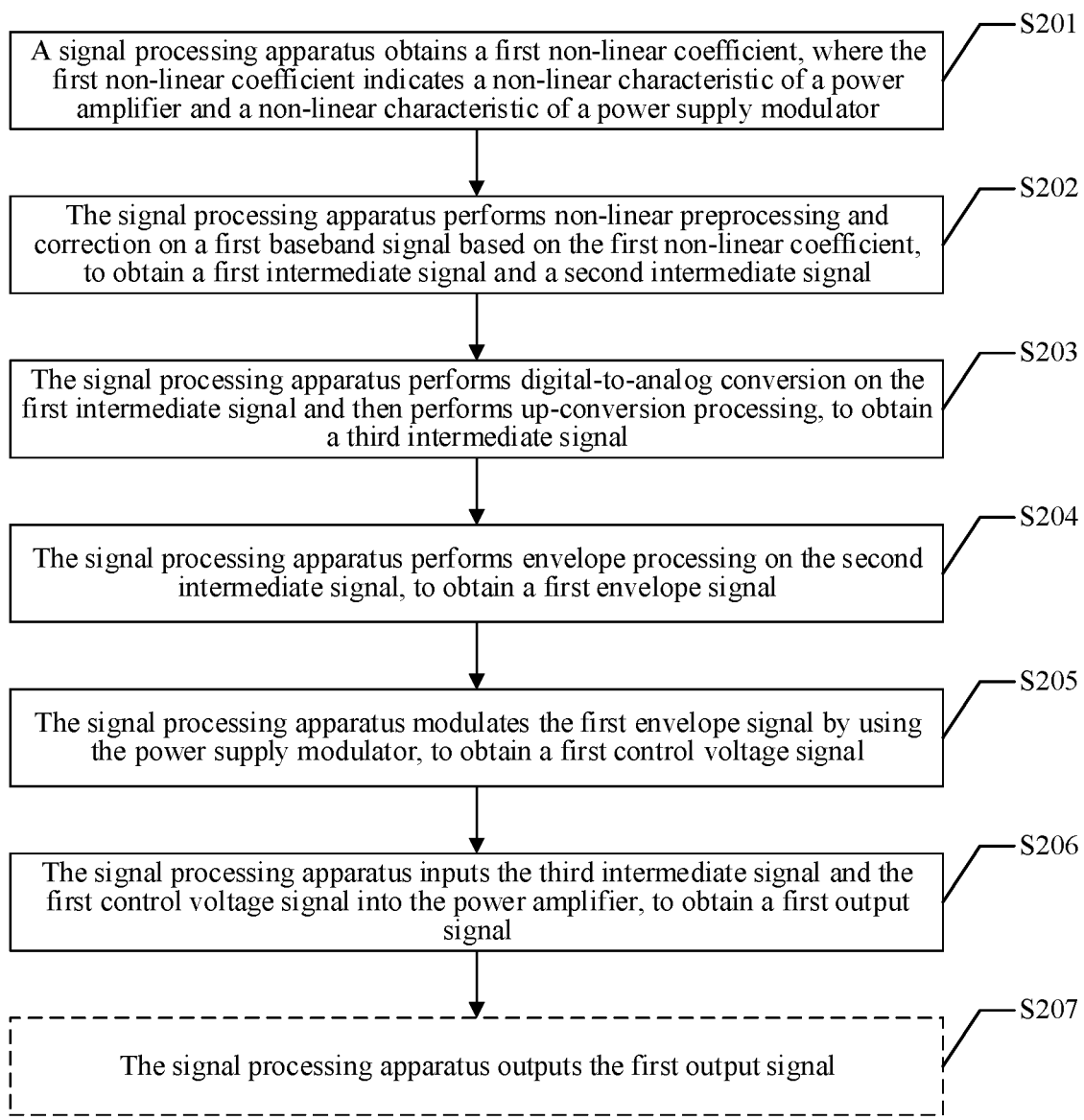
FIG. 2 is a schematic diagram of an embodiment of a signal processing method according to an embodiment of this application.

FIG. 2 is a schematic diagram of an embodiment of a signal processing method according to an embodiment of this application. Refer to FIG. 2. The communication processing method is applied to a signal processing apparatus. The signal processing apparatus includes a power amplifier and a power supply modulator. The communication processing method includes the following steps.

S201: The signal processing apparatus obtains a first non-linear coefficient, where the first non-linear coefficient indicates a non-linear characteristic of the power amplifier and a non-linear characteristic of the power supply modulator.

In some implementations, the first non-linear coefficient indicates a first non-linear characteristic of the power amplifier in a first working state and a second non-linear characteristic of the power supply modulator in a second working state.

Optionally, the non-linear characteristic of the power amplifier is related to at least one of the following parameters: a temperature of the power amplifier and a power back-off point of the power amplifier. The power back-offpoint of the power amplifier may be indicated by a magnitude and a change of input power of the power amplifier.

At different temperatures and different power back-off points, non-linear characteristics of the power amplifier may be different. In this application, a non-linear characteristic of the power amplifier at a specific temperature and a specific power back-off point may be understood as a non-linear characteristic of the power amplifier in a working state of the characteristic. Non-linear characteristics of the power amplifier may be different in different working states.

Optionally, the non-linear characteristic of the power supply modulator is related to at least one of the following parameters: a characteristic of the power supply modulator and a magnitude of envelope fluctuation of an envelope signal that is input into the power supply modulator.

Non-linear characteristics of the power supply modulator may be different in different magnitudes of the envelope fluctuation. In this application, a non-linear characteristic of the power supply modulator in a magnitude of envelope fluctuation of a specific characteristic may be understood as a non-linear characteristic of the power supply modulator in a working state of the characteristic. Non-linear characteristics of the power supply modulator may be different in different working states.

In some implementations, the first non-linear coefficient indicates the first non-linear characteristic of the power amplifier in the first working state and the second non-linear characteristic of the power supply modulator in the second working state.

In some implementations, the first non-linear coefficient is generated based on a second baseband signal, a second output signal, a second envelope signal, and a second control voltage signal. For related descriptions of the second baseband signal, the second output signal, the second envelope signal, the second control voltage signal, and a specific generation process of the first non-linear coefficient, refer to related descriptions in the following descriptions. Details are not described herein.

Optionally, the power amplifier is a low power amplifier or a high power amplifier. For example, the signal processing apparatus is a terminal device, and the power of the power amplifier may be 20 dBm (decibel milliwatts). For example, the signal processing apparatus is a network device, and the power of the power amplifier may be greater than or equal to 40 dBm and less than or equal to 50 dBm.

Optionally, the power supply modulator is a constant power supply modulator or a dynamic power supply modulator. A voltage signal output by the constant power supply modulator is constant. A voltage signal output by the dynamic power supply modulator changes dynamically with envelope fluctuation of an envelope signal that is input into the dynamic power supply modulator.

S202: The signal processing apparatus performs non-linear preprocessing and correction on a first baseband signal based on the first non-linear coefficient, to obtain a first intermediate signal and a second intermediate signal.

Specifically, the signal processing apparatus stores a non-linear preprocessing and correction model. The signal processing apparatus inputs the first non-linear coefficient and the first baseband signal into the non-linear preprocessing and correction model, and the non-linear preprocessing and correction model outputs the first intermediate signal and the second intermediate signal. The non-linear preprocessing and correction model may be obtained through training by the signal processing apparatus, or the non-linear preprocessing and correction model may be preconfigured.

S203: The signal processing apparatus performs digital-to-analog conversion on the first intermediate signal and then performs up-conversion processing, to obtain a third intermediate signal.

S204: The signal processing apparatus performs envelope processing on the second intermediate signal, to obtain a first envelope signal.

In step S204, the signal processing apparatus performs envelope shaping processing on the second intermediate signal, to obtain a fifth envelope signal. The signal processing apparatus performs digital-to-analog conversion processing and envelope amplification processing on the fifth envelope signal, to obtain the first envelope signal.

S205: The signal processing apparatus modulates the first envelope signal by using the power supply modulator, to obtain a first control voltage signal.

In step S205, the signal processing apparatus traces envelope fluctuation of the first envelope signal by using the power supply modulator, to obtain the first control voltage signal. The first control voltage signal indicates the envelope fluctuation of the first envelope signal.

Optionally, in step S205, the signal processing apparatus modulates the first envelope signal by using the power supply modulator, to obtain the first control voltage signal, to enable the power supply modulator to be in a third working state.

The third working state is the same as or different from the second working state. For example, the second working state and the third working state are two working states in which the power supply modulator works in a same or similar magnitude of the envelope fluctuation.

S206: The signal processing apparatus inputs the third intermediate signal and the first control voltage signal into the power amplifier, to obtain a first output signal.

Optionally, in step S206, the signal processing apparatus inputs the third intermediate signal and the first control voltage signal into the power amplifier, to obtain the first output signal, to enable the power amplifier to be in a fourth working state.

The fourth working state is the same as or different from the first working state. For example, the first working state and the fourth working state are two working states in which the power amplifier works at a same or similar temperature and a same or similar power back-off point.

In some possible implementations, an error between a total non-linear characteristic of a fourth non-linear characteristic and a fifth non-linear characteristic and a total non-linear characteristic of the first non-linear characteristic and the second non-linear characteristic that is indicated by the first non-linear coefficient is less than or equal to a first threshold.

Optionally, a factor for setting a value of the first threshold includes at least one of the following: a user performance requirement, or current communication link performance. For example, a user requires the signal processing apparatus to perform strict non-linear compensation for a signal to support higher-order modulation. In this case, the first threshold may be −40 dB (decibel). If the user has a low requirement for the non-linear compensation for the signal, the first threshold may be −20 dB.

Optionally, the error between the total non-linear characteristic of the fourth non-linear characteristic and the fifth non-linear characteristic and the total non-linear characteristic of the first non-linear characteristic and the second non-linear characteristic that is indicated by the first non-linear coefficient may be indirectly indicated by using a second parameter $\theta_2$. The second parameter $\theta_2$ is less than or equal to the first threshold.

The second parameter $\theta_2 = \|Y_1 - X_1 h^2\|$, where $\|Y_1 - X_1 h^2\|$ indicates to calculate a quadratic norm of $Y_1 - X_1 h$. $Y_1$ is a first output matrix, $X_1$ is a first input matrix, and h is the first non-linear coefficient. The first input matrix is equal to a product of a first matrix and second matrix. The first matrix is a matrix constructed based on the first baseband signal, and the second matrix is a matrix constructed based on the fifth envelope signal. The first output matrix is equal to a product of a third matrix and a fourth matrix. The third matrix is a matrix constructed based on the first output signal, and the fourth matrix is a matrix constructed based on the first control voltage signal.

The signal processing apparatus constructs the first matrix based on the first baseband signal. The signal processing apparatus constructs the second matrix based on the fifth envelope signal. The signal processing apparatus constructs the third matrix based on the first output signal. The signal processing apparatus constructs the fourth matrix based on the first control voltage signal.

For example, the first baseband signal is represented as $x_1$, and the signal processing apparatus selects N sampling points from the first baseband signal $x_1$ in a sampling manner, where the N sampling points are respectively $x_1(0)$, $x_1(1)$, $x_1(2)$ ... $x_1(P)$ ... $x_1(N)$.

The signal processing apparatus constructs the first matrix R1 based on $x_1(0)$, $x_1(1)$, $x_1(2)$ ... $x_1(P)$ ... $x_1(N)$, where $$R1 = \begin{bmatrix} x_1(0) & 0 & \ldots & 0 \\ x_1(1) & x_1(0) & \ldots & 0 \\ \ldots & \ldots & \ldots & \ldots \\ x_1(P) & x_1(P-2) & \ldots & x_1(0) \\ \ldots & \ldots & \ldots & \ldots \\ x_1(N) & x_1(N-1) & \ldots & x_1(N-P) \end{bmatrix} . N$$

is an integer greater than or equal to 1, and P is an integer greater than or equal to 1 and less than or equal to N.

Optionally, a value of N and a value of P are related to the user performance requirement. If the user performance requirement is high, the value of N and the value of P may be large. If the user performance requirement is low, the value of N and the value of P may be small. For example, in a backhaul scenario, the user requires the signal processing apparatus to perform the strict non-linear compensation for the signal to support the higher-order modulation. In this case, the value of N may be 50, and the value of P may be 40.

A process of constructing the second matrix is similar to a process of constructing the first matrix. For example, the fifth envelope signal is represented as $x_2$, and the signal processing apparatus selects N sampling points from the fifth envelope signal in the sampling manner, where the N sampling points are respectively $x_2(0)$, $x_2(1)$, $x_2(2)$ ... $x_2(P)$ ... $x_2(N)$. The signal processing apparatus constructs the second matrix S1 based on $x_2(0), x_2(1), x_2(2), \ldots x_2(P) \ldots x_2(N)$, $$\text{where } S1 = \begin{bmatrix} x_2(0) & 0 & \ldots & 0 \\ x_2(1) & x_2(0) & \ldots & 0 \\ \ldots & \ldots & \ldots & \ldots \\ x_2(P) & x_2(P-2) & \ldots & x_2(0) \\ \ldots & \ldots & \ldots & \ldots \\ x_2(N) & x_2(N-1) & \ldots & x_2(N-P) \end{bmatrix}.$$

$$X_1 = R1 * S1 = \begin{bmatrix} x_1(0) & 0 & \ldots & 0 \\ x_1(1) & x_1(0) & \ldots & 0 \\ \ldots & \ldots & \ldots & \ldots \\ x_1(P) & x_1(P-2) & \ldots & x_1(0) \\ \ldots & \ldots & \ldots & \ldots \\ x_1(N) & x_1(N-1) & \ldots & x_1(N-P) \end{bmatrix}$$

$$\begin{bmatrix} x_2(0) & 0 & \ldots & 0 \\ x_2(1) & x_2(0) & \ldots & 0 \\ \ldots & \ldots & \ldots & \ldots \\ x_2(P) & x_2(P-2) & \ldots & x_2(0) \\ \ldots & \ldots & \ldots & \ldots \\ x_2(N) & x_2(N-1) & \ldots & x_2(N-P) \end{bmatrix}.$$

The second output signal is represented as $y_1$, and the signal processing apparatus selects N sampling points from the second output signal $y_1$ in the sampling manner, where the N sampling points are respectively $y_1(0)$, $y_1(1)$, $y_1(2)$ ... $y_1(N)$. The signal processing apparatus constructs the third matrix Q1 based on $y_1(0)$, $y_1(1)$, $y_1(2)$ ... $y_1(N)$, where $Q1 = [y_1(0)\ y_1(1) \ldots y_1(N)]^T$. $[y_1(0)\ y_1(1) \ldots y_1(N)]^T$ indicates transposition of $[y_1(0)\ y_1(1) \ldots y_1(N)]$. A process of constructing the fourth matrix is similar to a process of constructing the third matrix. For example, the first control voltage signal is represented as $y_2$, and the signal processing apparatus selects N sampling points from the first control voltage signal in the sampling manner, where the N sampling points are respectively $y_2(0), y_2(1), y_2(2) \ldots y_2(N)$. The signal processing apparatus constructs the fourth matrix W1 based on $y_2(0), y_2(1), y_2(2) \ldots y_2(N)$, where $W1=[y_2(0)\ y_2(1) \ldots y_2(N)]^T$.

The first non-linear coefficient $h=[h_1\ h_2\ \ldots\ h_p]^T$, where each element in h is a complex number.

$Y_1 = Q1*W1[y_1(0)\ y_1(1)\ y_1(2)\ \ldots\ y_1(N)]^T [y_2(0)\ y_2(1)\ y_2(2)\ \ldots\ y_2(N)]^T$. The second parameter $\theta_2 = \|Y_1 - X_1 h\|^2$ where $\theta_2$ is less than or equal to the first threshold. This effectively compensates for non-linear distortion of a signal that is caused by the non-linear characteristic of the power supply modulator and the non-linear characteristic of the power amplifier, to enable the power amplifier to work in a non-linear region, and further improve efficiency of the power amplifier.

Optionally, the embodiment shown in FIG. 2 further includes step S207. Step S207 may be performed after step S206.

S207: The signal processing apparatus sends the first output signal.

In some implementations, the signal processing apparatus may send the first output signal through a wireless channel or a wired channel. For example, the signal processing apparatus is the network device. The network device sends the first output signal to a terminal device through the wireless channel.

Figure 3:
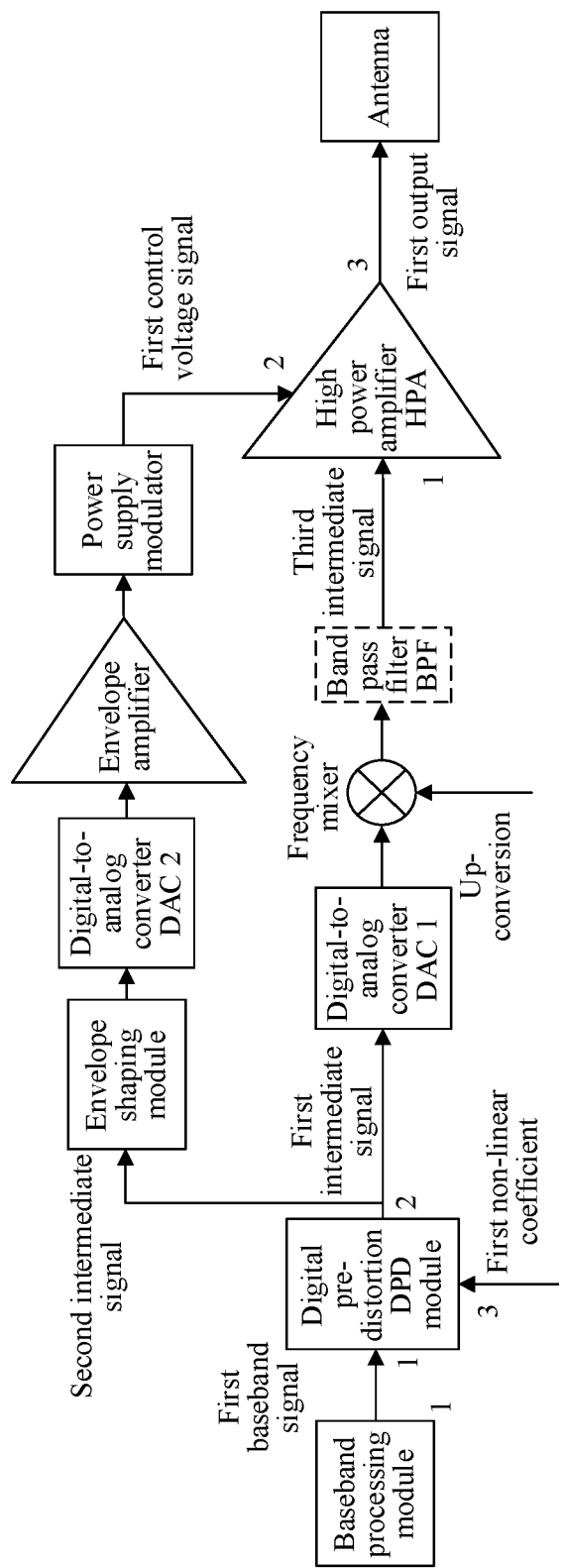
FIG. 3 is a schematic structural diagram of a signal processing apparatus according to an embodiment of this application.

For example, FIG. 3 is a schematic structural diagram of the signal processing apparatus. As shown in FIG. 3, the signal processing apparatus includes an antenna. The signal processing apparatus sends the first output signal through the antenna.

For example, the signal processing apparatus shown in FIG. 3 includes a baseband processing module, a digital pre-distortion (DPD) module, a digital-to-analog converter 1 (DAC 1), a frequency mixer, a high power amplifier (HPA), an envelope shaping module, a DAC 2, an envelope amplifier, and the power supply modulator.

A first end of the baseband processing module is connected to a first end of the DPD module. A second end of the DPD module is connected to one end of the DAC 1 and one end of the envelope shaping module. Another end of the DAC 1 is connected to one end of the frequency mixer, and another end of the frequency mixer is connected to a first end of the high power amplifier. Another end of the envelope shaping module is connected to one end of the DAC 2, another end of the DAC 2 is connected to one end of the envelope amplifier, another end of the envelope amplifier is connected to one end of the power supply modulator, and another end of the power supply modulator is connected to a second end of the high power amplifier.

The baseband processing module is configured to generate a baseband signal. The DPD module is configured to perform non-linear preprocessing and correction on the baseband signal. Both the DAC 1 and the DAC 2 are configured to convert a digital signal to an analog signal. The frequency mixer is configured to perform a frequency domain transformation on the analog signal. The envelope shaping module is configured to generate an envelope signal. The HPA is configured to perform power amplification on a signal that is input into the first end of the HPA. The envelope amplifier is configured to perform envelope amplification processing on the envelope signal. The power supply modulator is configured to modulate the envelope signal, that is, trace an envelope change of the envelope signal, to obtain a control voltage signal.

Optionally, the signal processing apparatus further includes a band pass filter (BPF) and an antenna. The band pass filter is configured to filter a signal. The antenna is configured to send the signal.

In an implementation, another end of the frequency mixer is connected to one end of the band pass filter, and another end of the band-pass filter is connected to the first end of the high power amplifier. The following describes the procedure in the embodiment shown in FIG. 2 by using the implementation.

Step S201 specifically includes: The baseband processing module generates the first baseband signal, and inputs the first baseband signal into the first end of the DPD module. Step S202 specifically includes: The DPD module obtains the first non-linear coefficient by using a third end of the DPD module. The DPD module performs the non-linear preprocessing and correction on the first baseband signal based on the first non-linear coefficient, to obtain the first intermediate signal and the second intermediate signal, inputs the first intermediate signal into the DAC 1, and inputs the second intermediate signal into the envelope shaping module.

Step S203 specifically includes: The DAC 1 performs the digital-to-analog conversion on the first intermediate signal, performs the up-conversion processing by using the frequency mixer, and performs filtering processing by using the band pass filter, to obtain the third intermediate signal. The band pass filter inputs the third intermediate signal into the high power amplifier. Step S204 specifically includes: The envelope shaping module performs the envelope shaping processing on the second intermediate signal, to obtain the fifth envelope signal, and inputs the fifth envelope signal to the DAC 2. The DAC 2 performs the digital-to-analog conversion processing on the fifth envelope signal and then performs the envelope amplification processing by using the envelope amplifier, to obtain the first envelope signal. The envelope amplifier inputs the first envelope signal into the power supply modulator. Step S205 specifically includes: The power supply modulator modulates the first envelope signal, to obtain the first control voltage signal. Step S206 specifically includes: The third intermediate signal passes the band pass filter and then is input into the high power amplifier. The power supply modulator inputs the first control voltage signal into the high power amplifier. The high power amplifier outputs the first output signal, and sends the first output signal through the antenna.

It should be noted that, in the foregoing signal processing apparatus shown in FIG. 3, the DPD module is used as an example to describe the solution in which the signal processing apparatus performs the non-linear preprocessing and correction on the first baseband signal. In this application, a name of the DPD module is not limited as long as the module has a non-linear preprocessing and correction function. For example, in the example shown in FIG. 3, the DPD module may be replaced with an analog non-linear pre-correction module, a non-linear joint compensation module, a non-linear pre-equalization module, or the like. The following describes the technical solutions of this application by using the DPD module as an example.

It should be noted that, in the foregoing solutions of the signal processing apparatus shown in FIG. 3, the first output signal is sent through the antenna. In actual application, the signal processing apparatus may alternatively send the first output signal in a wired connection manner. This is not specifically limited in this application. For example, the signal processing apparatus sends the first output signal through an optical fiber.

In this embodiment of this application, the signal processing apparatus obtains the first non-linear coefficient, where the first non-linear coefficient indicates the non-linear characteristic of the power amplifier and the non-linear characteristic of the power supply modulator. The signal processing apparatus performs the preprocessing and correction on the first baseband signal based on the first non-linear coefficient, to obtain the first intermediate signal and the second intermediate signal. The signal processing apparatus performs the digital-to-analog conversion on the first intermediate signal and then performs the up-conversion processing, to obtain the third intermediate signal. The signal processing apparatus performs the envelope processing on the second intermediate signal, to obtain the first envelope signal. The signal processing apparatus modulates the first envelope signal by using the power supply modulator, to obtain the first control voltage signal. The signal processing apparatus inputs the third intermediate signal and the first control voltage signal into the power amplifier, to obtain the first output signal. It can be learned that, in this application, the signal processing apparatus obtains the first non-linear coefficient, and performs the preprocessing and correction on the first baseband signal based on the first non-linear coefficient. The first non-linear coefficient indicates the non-linear characteristic of the power amplifier and the non-linear characteristic of the power supply modulator. In a signal processing process, the signal processing apparatus compensates for the non-linear distortion of the signal that is caused by the non-linear characteristic of the power supply modulator and the non-linear characteristic of the power amplifier, to enable the power amplifier to work in the non-linear region. When the power amplifier uses the same input power, if the non-linear distortion of the signal is not compensated, the power amplifier works in a linear region, and output power is low. However, the signal processing apparatus compensates for the non-linear distortion of the signal by using the first non-linear coefficient. The power amplifier may work in the non-linear region, and the output power of the power amplifier is high. This improves the efficiency of the power amplifier.

In this application, in step S201 in the embodiment shown in FIG. 2, the signal processing apparatus obtains the first non-linear coefficient. The following describes a specific process in which the signal processing apparatus obtains the first non-linear coefficient. Optionally, step S201 specifically includes step S2001.

S2001: The signal processing apparatus determines the first non-linear coefficient based on the second baseband signal, the second output signal, the second envelope signal, and the second control voltage signal.

The second output signal is a signal obtained by inputting a fourth intermediate signal and the second control voltage signal into the power amplifier, to enable the power amplifier to be in the first working state. The fourth intermediate signal is obtained by performing the digital-to-analog conversion on a fifth intermediate signal and then performing the up-conversion processing. The second envelope signal is a signal obtained by performing envelope shaping processing on a sixth intermediate signal. The fifth intermediate signal and the sixth intermediate signal each are intermediate signals obtained by performing the preprocessing and correction on the second baseband signal based on the second non-linear coefficient. The second control voltage signal is a signal obtained by modulating a third envelope signal by using the power supply modulator, to enable the power supply modulator to be in the second working state. The third envelope signal is a signal obtained by performing analog-to-digital conversion on the second envelope signal and then performing envelope amplification processing.

The second non-linear coefficient indicates the fifth non-linear characteristic of the power amplifier in a fifth working state and the sixth non-linear characteristic of the power supply modulator in a sixth working state. For the fifth working state and the sixth working state, refer to related descriptions in step S201 in the embodiment shown in FIG. 2. Details are not described herein again.

Optionally, an error between a total non-linear characteristic indicated by the second non-linear coefficient and a total non-linear characteristic indicated by the first non-linear coefficient is less than or equal to the first threshold. For related descriptions that the error between the total non-linear characteristic indicated by the second non-linear coefficient and the total non-linear characteristic indicated by the first non-linear coefficient is less than or equal to the first threshold, refer to related descriptions in step S206 in the embodiment shown in FIG. 2. Details are not described herein again.

The following describes a reason why the signal processing apparatus determines the first non-linear coefficient based on the second baseband signal, the second output signal, the second envelope signal, and the second control voltage signal.

For example, as shown in FIG. 3, if an input signal of the high power amplifier is represented as $x_A$, and an output signal of the high power amplifier is represented as $y_A$, a relationship between $y_A$ and $x_A$ may be represented as Formula 1:

$$y_A = g_A(|x_a|)x_A \qquad \text{Formula 1}$$

where $g_A(|x_A|)$ is a model of the high power amplifier. In an envelope tracing technology in which the power supply modulator modulates a strategy, the power supply modulator causes a complex gain change. This application proposes that the non-linear characteristic of the power supply modulator is used as a considered parameter for non-linear compensation, to compensate for a problem of the non-linear distortion caused by the power supply modulator.

$g_A(|x_A|)$ in Formula 1 may be represented as Formula 2.

$$g_A(|x_a|) = g_{A\_AM}(|x_A|) * e^{jg_{A\_PM}(|x_A|)} \qquad \text{Formula 2}$$

In Formula 2, $g_{A\_AM}(|X_A|)$ indicates an amplitude component of the model of the power amplifier, and $g_{A\_PM}(|X_A|)$ indicates a phase component of the model of the power amplifier.

In Formula 2, $g_{A\_AM}(|X_A|)$ may be represented as Formula 3.

$$g_{A\_AM}(|x_A|) = \sum_{i=1}^{Ni} c_i^{A\_AM} |x_A|^i \qquad \text{Formula 3}$$

In Formula 3, $c_i^{A\_AM}$ indicates a coefficient of a series expansion expression of the amplitude component of the model of the power amplifier. A value of $N_i$ is determined by the strength of the non-linear characteristic of the high power amplifier. Generally, a stronger strength of the non-linear characteristic of the high power amplifier indicates a larger value of $N_i$. Generally, the value of $N_i$ is 5.

In Formula 2, $g_{A\_PM}(|X_A|)$ may be represented as Formula 4.

$$g_{A\_PM}(|x_A|) = \sum_{i=1}^{Ni} c_i^{A\_AP} |x_A|^i \qquad \text{Formula 4}$$

where $c_i^{A\_AM}$ indicates a coefficient of a series expansion expression of the phase component of the model of the power amplifier. For a value of $N_i$, refer to the foregoing related descriptions. Details are not described herein again.

The values of $c_i^{A\_AM}$ and $c_i^{A\_AP}$ are not constants, but are related to an excitation effect of the envelope change of the second control voltage signal on the power amplifier. Therefore, the output signal of the power amplifier is related to the envelope change of the second control voltage signal. Therefore, Formula 3 may be replaced with Formula 5.

$$g_{A\_AM}(|x_A|) = \sum_{i=1}^{Ni} \left( p_i^{A\_AM} \cdot (V_{env}) \cdot |x_A|^i \right) \qquad \text{Formula 5}$$

where $p_i^{A\_AM}$ indicates a coefficient of the amplitude component of the model of the power amplifier that is indicated by using the second control voltage signal, and $V_{env}$ is a magnitude of a voltage of the second control voltage signal.

Therefore, Formula 4 may be replaced with Formula 6.

$$g_{A\_PM}(|x_A|) = \sum_{i=1}^{Ni} \left( p_i^{A\_AP} \cdot (V_{env}) \cdot |x_A|^i \right) \qquad \text{Formula 6}$$

where $p_i^{A\_AP}$ indicates a coefficient of the phase component of the model of the power amplifier that is indicated by using the second control voltage signal.

It can be learned from Formula 5 and Formula 6 that the output signal of the power amplifier is related to the envelope change of the second control voltage signal. Therefore, the signal processing apparatus may determine the first non-linear coefficient with reference to the second baseband signal, the second output signal, the second control voltage signal, and the second envelope signal.

The following describes the foregoing step S2001 with reference to step S2001a to step S2001c.

S2001a: The signal processing apparatus determines a fifth matrix, a sixth matrix, a seventh matrix, and an eighth matrix.

The fifth matrix is a matrix obtained through construction based on the second baseband signal, and the sixth matrix is a matrix obtained through construction based on the second envelope signal. The seventh matrix is a matrix obtained through construction based on the second output signal, and the eighth matrix is a matrix obtained through construction based on the second control voltage.

Processes of constructing the fifth matrix, the sixth matrix, the seventh matrix, and the eighth matrix are similar to the processes of constructing the first matrix, the second matrix, the third matrix, and the fourth matrix in step S206 in the embodiment shown in FIG. 2. For details, refer to the foregoing related descriptions. It can be learned that the second baseband signal may be represented as $x_3$, and the fifth matrix $$R2 = \begin{bmatrix} x_3(0) & 0 & \ldots & 0 \\ x_3(1) & x_3(0) & \ldots & 0 \\ \ldots & \ldots & \ldots & \ldots \\ x_3(P) & x_3(P-2) & \ldots & x_3(0) \\ \ldots & \ldots & \ldots & \ldots \\ x_3(N) & x_3(N-1) & \ldots & x_3(N-P) \end{bmatrix}.$$

The second envelope signal may be represented as $x_4$, and the sixth matrix $$S2 = \begin{bmatrix} x_4(0) & 0 & \ldots & 0 \\ x_4(1) & x_4(0) & \ldots & 0 \\ \ldots & \ldots & \ldots & \ldots \\ x_4(P) & x_4(P-2) & \ldots & x_4(0) \\ \ldots & \ldots & \ldots & \ldots \\ x_4(N) & x_4(N-1) & \ldots & x_4(N-P) \end{bmatrix}.$$

The second output signal may be represented as $y_3$, and the seventh matrix $Q3 = [y_3(0)\ y_3(1)\ \ldots\ y_3(N)]^T$. The second control voltage signal may be represented as $y_4$, and the eighth matrix $W2 = [y_4(0)\ y_4(1)\ \ldots\ y_4(N)]^T$∘.

S2001b: The signal processing apparatus determines a second input matrix based on the fifth matrix and the sixth matrix, and determines a second output matrix based on the seventh matrix and the eighth matrix.

The second input matrix is equal to a product of the fifth matrix and the sixth matrix. The second output matrix is equal to a product of the seventh matrix and the eighth matrix.

For example, the second input matrix is represented as $$X_2 = R2 * S2 = \begin{bmatrix} x_3(0) & 0 & \ldots & 0 \\ x_3(1) & x_3(0) & \ldots & 0 \\ \ldots & \ldots & \ldots & \ldots \\ x_3(P) & x_3(P-2) & \ldots & x_3(0) \\ \ldots & \ldots & \ldots & \ldots \\ x_3(N) & x_3(N-1) & \ldots & x_3(N-P) \end{bmatrix}$$

$$\begin{bmatrix} x_4(0) & 0 & \ldots & 0 \\ x_4(1) & x_4(0) & \ldots & 0 \\ \ldots & \ldots & \ldots & \ldots \\ x_4(P) & x_4(P-2) & \ldots & x_4(0) \\ \ldots & \ldots & \ldots & \ldots \\ x_4(N) & x_4(N-1) & \ldots & x_4(N-P) \end{bmatrix},$$

and the second output matrix $$X_2 = R2 * S2 = \begin{bmatrix} x_3(0) & 0 & \ldots & 0 \\ x_3(1) & x_3(0) & \ldots & 0 \\ \ldots & \ldots & \ldots & \ldots \\ x_3(P) & x_3(P-2) & \ldots & x_3(0) \\ \ldots & \ldots & \ldots & \ldots \\ x_3(N) & x_3(N-1) & \ldots & x_3(N-P) \end{bmatrix}$$

-continued $$\begin{bmatrix} x_4(0) & 0 & \cdots & 0 \\ x_4(1) & x_4(0) & \cdots & 0 \\ \cdots & \cdots & \cdots & \cdots \\ x_4(P) & x_4(P-2) & \cdots & x_4(0) \\ \cdots & \cdots & \cdots & \cdots \\ x_4(N) & x_4(N-1) & \cdots & x_4(N-P) \end{bmatrix}.$$

S2001c: The signal processing apparatus determines the first non-linear coefficient based on a preset algorithm, the second input matrix, and the second output matrix.

Optionally, the preset algorithm includes a least square method, a minimum mean square error algorithm, or a zero forcing method.

For example, the signal processing apparatus determines the first parameter $\theta_1$ based on the second input matrix, the second output matrix, and the second non-linear coefficient, where $\theta_1 \| Y_2 - X_2 h \|^2$. Here, $X_2$ is the second input matrix, $Y_2$ is the second output matrix, h indicates the first non-linear coefficient, $h = [h_1 \ h_2 \ \ldots \ h]^T$, and each element in h is a complex number. The signal processing apparatus uses, as a target, minimizing the value of the first parameter $\theta_1$. It may be determined, by using the least square method, that when $h = (X_2^T X_2)^{-1} X_2^T Y_2$, the value of the first parameter $\theta_1$ is minimized. Therefore, the first non-linear coefficient $h = (X_2^T X_2)^{-1} X_2^T Y_2$, and $X_2^T$ indicates transposition of $X_2$.

It can be learned that step S2001a to step S2001c show a specific process in which the signal processing apparatus obtains the first non-linear coefficient. This provides a foundation for implementing the solutions. Before step S2001, the signal processing apparatus may obtain the second baseband signal, the second output signal, the second envelope signal, and the second control voltage signal.

Figure 4:
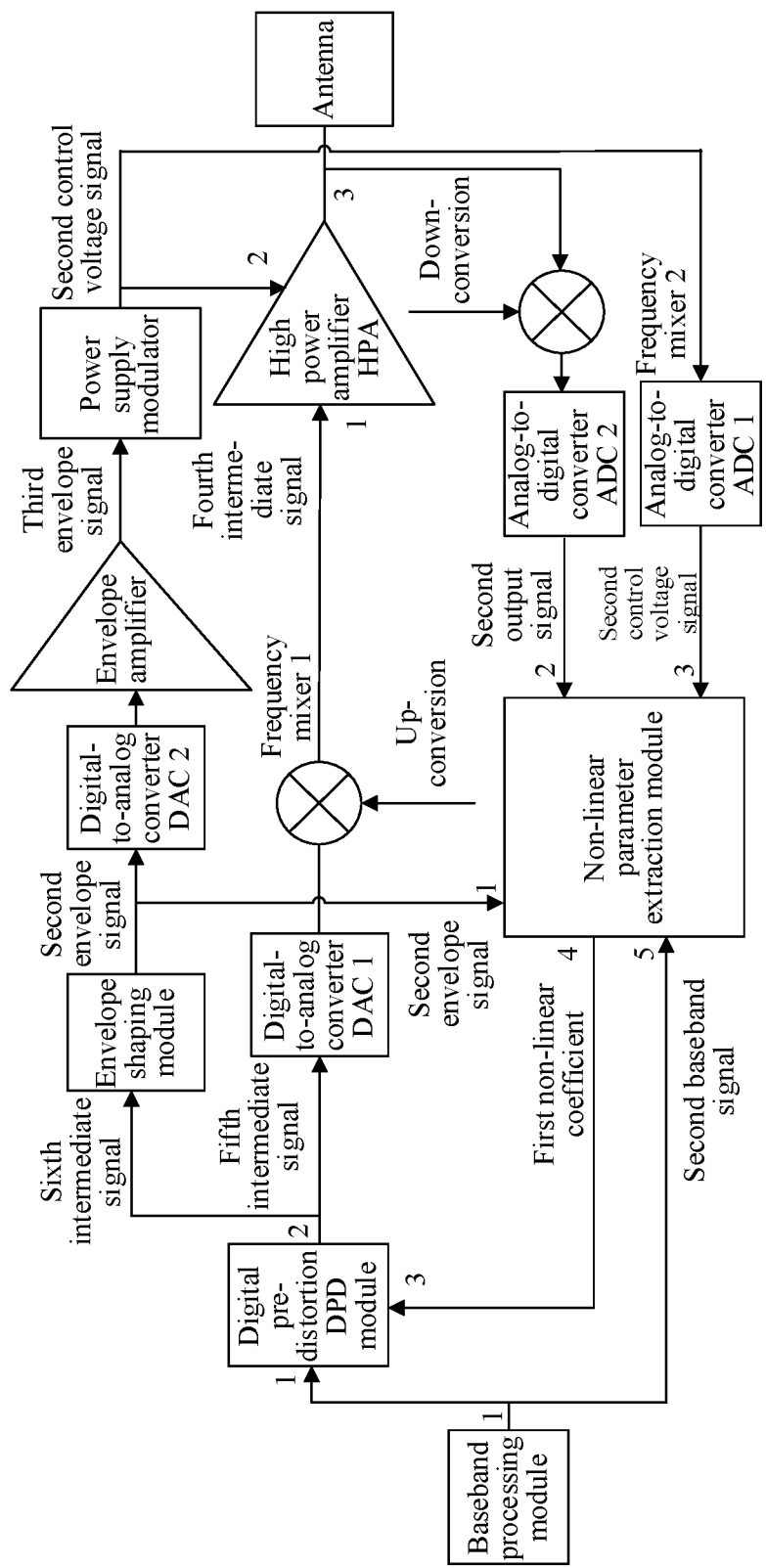
FIG. 4 is another schematic structural diagram of a signal processing apparatus according to an embodiment of this application.

With reference to FIG. 4, the following describes a process in which the signal processing apparatus obtains the second baseband signal, the second output signal, the second envelope signal, and the second control voltage signal, and a process in which the signal processing apparatus determines the first non-linear coefficient based on the second baseband signal, the second output signal, the second envelope signal, and the second control voltage signal. FIG. 4 is another schematic structural diagram of the signal processing apparatus. Refer to FIG. 4. The signal processing apparatus includes a baseband processing module, a DPD module, a DAC 1, a frequency mixer 1, a high power amplifier, an envelope shaping module, a DAC 2, an envelope amplifier, a power supply modulator, a non-linear parameter extraction module, an analog-to-digital converter ADC 1, an ADC 2, a frequency mixer 2, and an antenna. The non-linear parameter extraction module is configured to extract a non-linear coefficient. Both the ADC 1 and the ADC 2 are configured to convert an analog signal to a digital signal. For a function description of another module or component, refer to the related description in FIG. 3.

A first end of the baseband processing module is connected to a first end of the DPD module. A second end of the DPD module is connected to one end of the DAC 1 and one end of the envelope shaping module. Another end of the DAC 1 is connected to one end of the frequency mixer, and another end of the frequency mixer 1 is connected to a first end of the high power amplifier. Another end of the envelope shaping module is separately connected to one end of the DAC 2 and a first end of the non-linear parameter extraction module, another end of the DAC 2 is connected to one end of the envelope amplifier, another end of the envelope amplifier is connected to one end of the power supply modulator, another end of the power supply modulator is separately connected to a second end of the high power amplifier and one end of the ADC 1, and another end of the ADC 1 is connected to a second end of the non-linear parameter extraction module. A third end of the high power amplifier is connected to one end of the frequency mixer 2, another end of the frequency mixer 2 is connected to one end of the ADC 2, and another end of the ADC 2 is connected to a third end of the non-linear parameter extraction module. A fourth end of the non-linear parameter extraction module is connected to a third end of the DPD module. The first end of the baseband processing module is further connected to a fifth end of the non-linear parameter extraction module. An output end of the high power amplifier is connected to the antenna.

The baseband signal processing module generates the second baseband signal, and separately inputs the second baseband signal into the DPD module and the non-linear parameter extraction module. The DPD module performs the non-linear preprocessing and correction on the second baseband signal, to obtain the fifth intermediate signal and the sixth intermediate signal, inputs the fifth intermediate signal into the DAC 1, and inputs the sixth intermediate signal into the envelope shaping module. The DAC 1 performs the digital-to-analog conversion processing on the fifth intermediate signal and then performs the up-conversion processing by using the frequency mixer 1, to obtain the fourth intermediate signal. The frequency mixer 1 inputs the fourth intermediate signal into the high power amplifier.

The envelope shaping module performs the envelope processing on the sixth intermediate signal, to obtain the second envelope signal, and inputs the second envelope signal into the DAC 2. The DAC 2 performs the digital-to-analog conversion processing on the second envelope signal and then performs envelope amplification by using the envelope amplifier, to obtain the third envelope signal. The envelope amplifier inputs the third envelope signal into the power supply modulator. The power supply modulator modulates the third envelope signal, to obtain the second control voltage signal, and separately inputs the second control voltage signal into the high power amplifier and the ADC 1. The ADC 1 inputs the second control voltage signal into the non-linear parameter extraction parameter. The high power amplifier receives the fourth intermediate signal and the second control voltage signal, and separately outputs the second output signal to the antenna and the frequency mixer 2. The antenna sends the second output signal. The frequency mixer 2 inputs the second output signal into the ADC 2, and the ADC 2 inputs the second output signal into the non-linear parameter extraction module.

The non-linear parameter extraction module determines the first non-linear coefficient based on the second baseband signal, the second output signal, the second envelope signal, and the second control voltage signal. For a specific determining process, refer to related descriptions of step S2001a to step S2001c. Details are not described herein again.

It can be learned from the structure shown in FIG. 4 that the non-linear parameter extraction module may obtain the non-linear coefficient through a plurality of iterations. The non-linear coefficient obtained by the non-linear parameter extraction module through the plurality of iterations does not change or changes slightly, in other words, the iterations of the non-linear parameter extraction module achieves convergence. Generally, the convergence can be achieved by performing 200 iterations by the non-linear parameter extraction module. In adjacent two iterations, in the structure shown in FIG. 4, the working states of the high power amplifier and the power supply modulator are similar or the same. In other words, when the iterations converge, the non-linear coefficient does not change or changes slightly. Therefore, in step S206 in the embodiment shown in FIG. 2, the first working state of the power amplifier may be similar to or the same as the third working state of the power amplifier, and the second working state of the power supply modulator may be similar to or the same as the fourth working state of the power supply modulator. In this case, the signal processing apparatus can effectively compensate, by using the first non-linear coefficient, for the non-linear distortion of the signal that is caused by the high power amplifier and the power supply modulator, to enable the power amplifier to work in the non-linear region. This improves the efficiency of the power amplifier, and improves performance of a communication system.

Optionally, before step S2001, step S2002 and step S2003 are further included.

S2002: The signal processing apparatus determines a first delay value and a second delay value.

S2003: The signal processing apparatus simultaneously obtains the second baseband signal and the second output signal based on the first delay value, and simultaneously obtains the second envelope signal and the second control voltage signal based on the second delay value.

For example, as shown in FIG. 4, the non-linear parameter extraction module obtains the second baseband signal, the second output signal, the second envelope signal, and the second control voltage signal. The non-linear parameter extraction module should simultaneously obtain the second baseband signal and the second output signal (that is, the second baseband signal and the second output signal simultaneously enter the non-linear parameter extraction module). The non-linear parameter extraction module should simultaneously obtain the second envelope signal and the second control voltage signal (that is, the second envelope signal and the second control voltage signal simultaneously enter the non-linear parameter extraction module), so that the non-linear parameter extraction module may accurately obtain the first non-linear coefficient, to enable the first non-linear coefficient to indicate the first non-linear characteristic of the high power amplifier in the first working state and indicate the second non-linear characteristic of the power supply modulator in the second working state.

The non-linear parameter extraction module may correlate the received second baseband signal with the second output signal. The non-linear parameter extraction module may determine the first delay value based on a correlation peak between the second baseband signal and the second output signal. The non-linear parameter extraction module may correlate the received second envelope signal with the second control voltage signal. The non-linear parameter extraction module may determine the second delay value based on a correlation peak between the second envelope signal and the second control voltage signal.

For example, both a length of the second baseband signal and a length of the second output signal are 500. If a value of a horizontal coordinate corresponding to the correlation peak is 500, the first delay value is 0, or if the value of the horizontal coordinate corresponding to the correlation peak is greater than 500 or less than 500, the first delay value is an absolute value of a difference between the correlation peak and the length of the second output signal. The method of determining the second delay value is similar. Details are not described herein.

Figure 5:
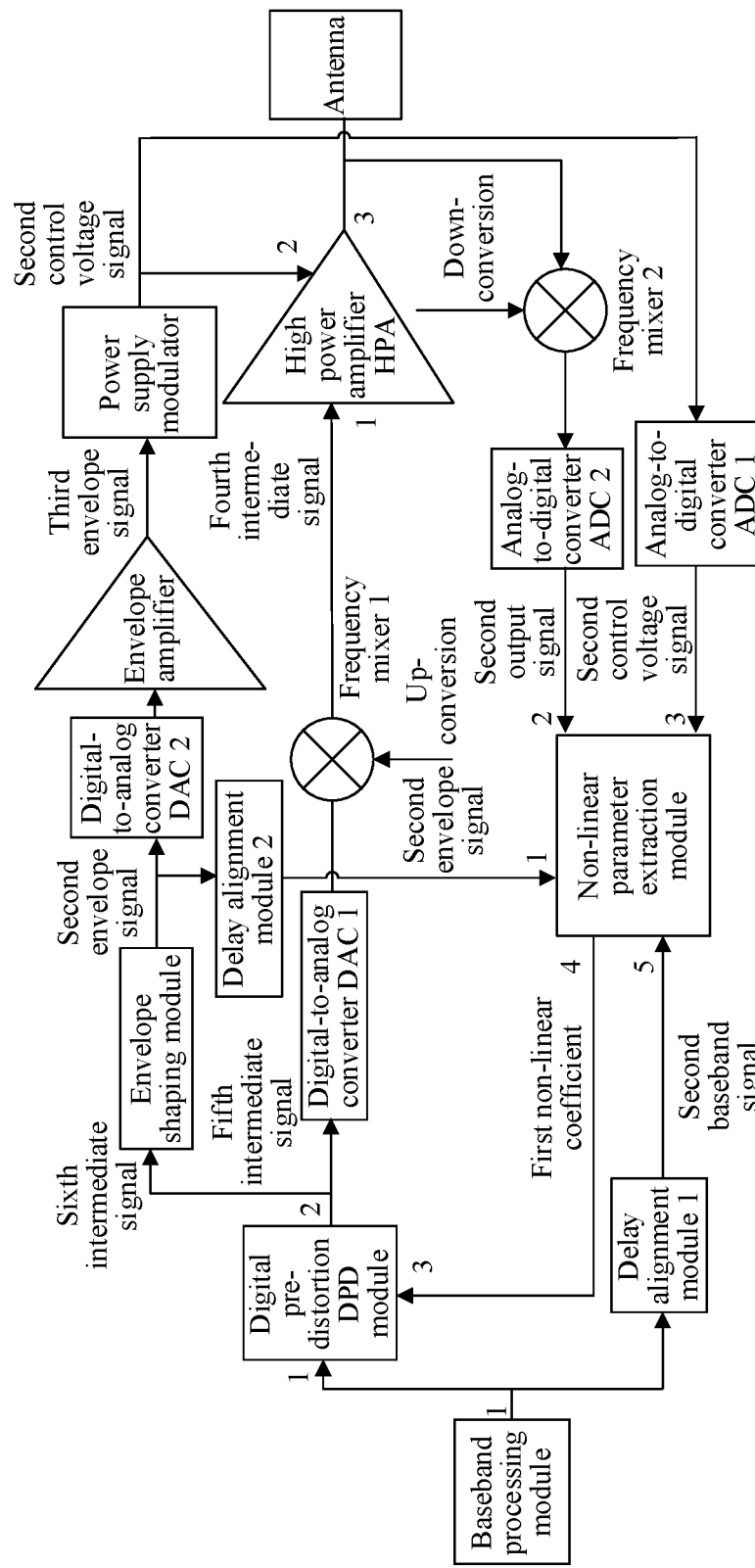
FIG. 5 is another schematic structural diagram of a signal processing apparatus according to an embodiment of this application.

Based on the foregoing implementations of step S2002 and step S2003, this application provides another signal processing apparatus. FIG. 5 is a schematic diagram of another embodiment of a signal processing apparatus according to an embodiment of this application. Compared with the signal processing apparatus shown in FIG. 4, the signal processing apparatus shown in FIG. 5 further includes a delay alignment module 1 and a delay alignment module 2. One end of the delay alignment module 1 is connected to the first end of the baseband processing module, and another end of the delay alignment module 1 is connected to the fifth end of the non-linear parameter extraction module. One end of the delay alignment module 2 is connected to one end of the envelope shaping module, and another end of the delay alignment module 2 is connected to the first end of the non-linear parameter extraction module. The non-linear parameter extraction module determines the first delay value and the second delay value by using the foregoing step S2002. The non-linear parameter extraction module sends the first delay value to the delay alignment module 1, and sends the second delay value to the delay alignment module 2. The delay alignment module 1 delays the second baseband signal by the first delay value and then sends the second baseband signal to the non-linear parameter extraction module. The delay alignment module 2 delays the second envelope signal by the second delay value and then sends the second envelope signal to the non-linear parameter extraction module. Therefore, the non-linear parameter extraction module simultaneously receives the second baseband signal and the second output signal, and the non-linear parameter extraction module simultaneously receives the second envelope signal and the second control voltage signal.

In this application, the signal processing apparatus may obtain a pre-adjustment parameter, to perform pre-adjustment processing on the fifth envelope signal in step S204 in the embodiment shown in FIG. 2. The following provides descriptions with reference to an embodiment shown in FIG. 6.

Figure 6:
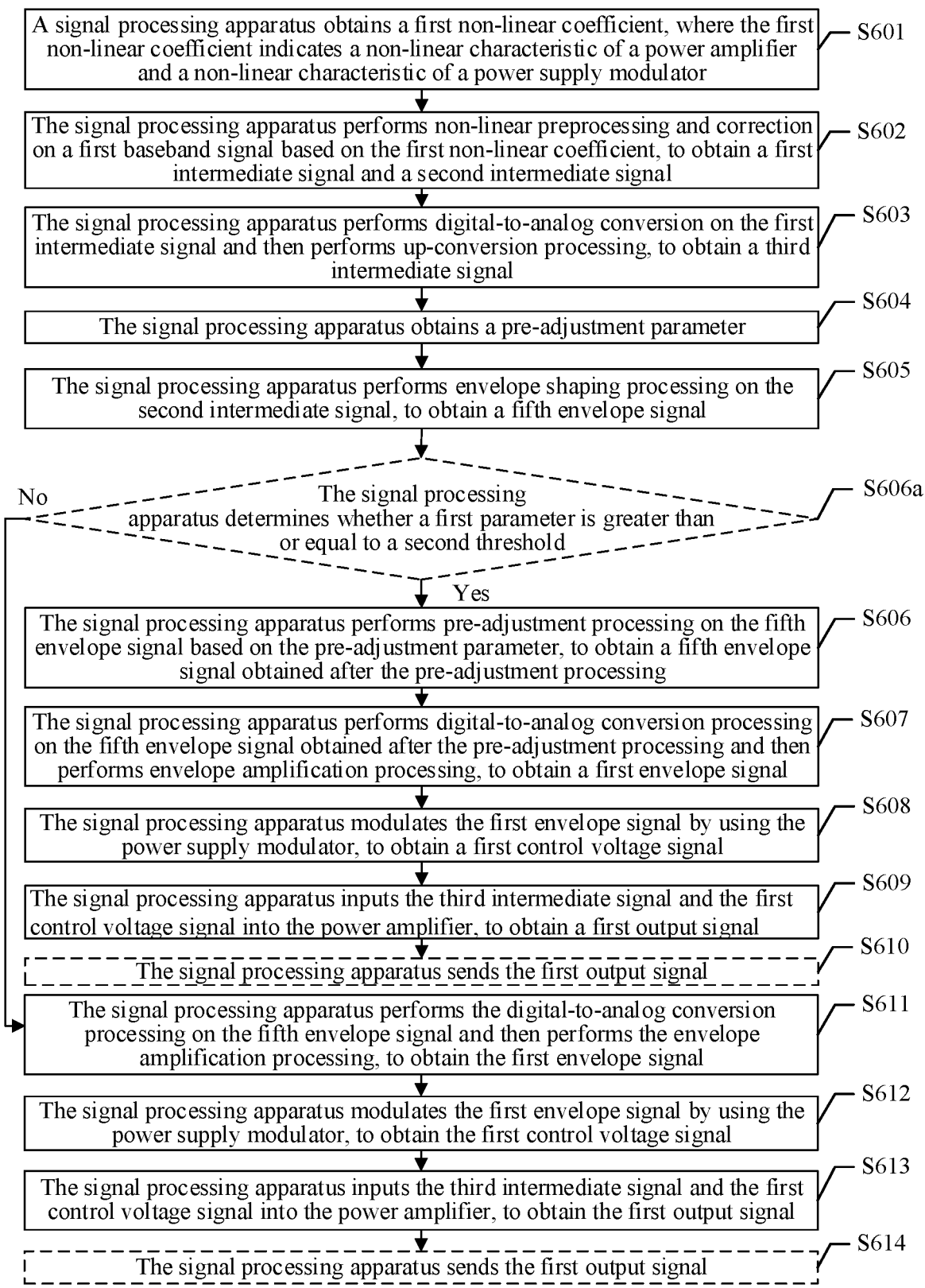
FIG. 6 is a schematic diagram of another embodiment of a signal processing method according to an embodiment of this application.

FIG. 6 is a schematic diagram of another embodiment of a signal processing method according to an embodiment of this application. Refer to FIG. 6. The signal processing method includes the following steps.

S601: A signal processing apparatus obtains a first non-linear coefficient, where the first non-linear coefficient indicates a non-linear characteristic of a power amplifier and a non-linear characteristic of a power supply modulator.

S602: The signal processing apparatus performs non-linear preprocessing and correction on a first baseband signal based on the first non-linear coefficient, to obtain a first intermediate signal and a second intermediate signal.

S603: The signal processing apparatus performs digital-to-analog conversion on the first intermediate signal and then performs up-conversion processing, to obtain a third intermediate signal.

Step S601 to step S603 are similar to step S201 to step S203 in the embodiment shown in FIG. 2. For details, refer to related descriptions of step S201 to step S203 in the embodiment shown in FIG. 2. Details are not described herein again.

S604: The signal processing apparatus obtains a pre-adjustment parameter.

The pre-adjustment parameter is used by the signal processing apparatus to pre-adjust a fifth envelope signal.

In some implementations, the pre-adjustment parameter includes a coefficient of a filter, and the coefficient of the filter is used to perform filtering processing on the fifth envelope signal. Optionally, the coefficient of the filter includes at least one of the following: a type of the filter, a length of the filter, and bandwidth of the filter.

Optionally, step S604 specifically includes: The signal processing apparatus determines the pre-adjustment parameter based on a second baseband signal, a second output signal, a second envelope signal, and a second control voltage signal.

For example, the signal processing apparatus is preconfigured with an initialization pre-adjustment parameter. The signal processing apparatus determines a first parameter $\theta_1$. For obtaining the first parameter $\theta_1$, refer to the foregoing related descriptions. The signal processing apparatus updates the initialization pre-adjustment parameter based on a minimum mean square error algorithm and the first parameter $\theta_1$, to obtain the pre-adjustment parameter in step S604.

For related descriptions of the second baseband signal, the second output signal, the second envelope signal, and the second control voltage signal, refer to related descriptions of the foregoing step S2001. Details are not described herein again.

Figure 7:
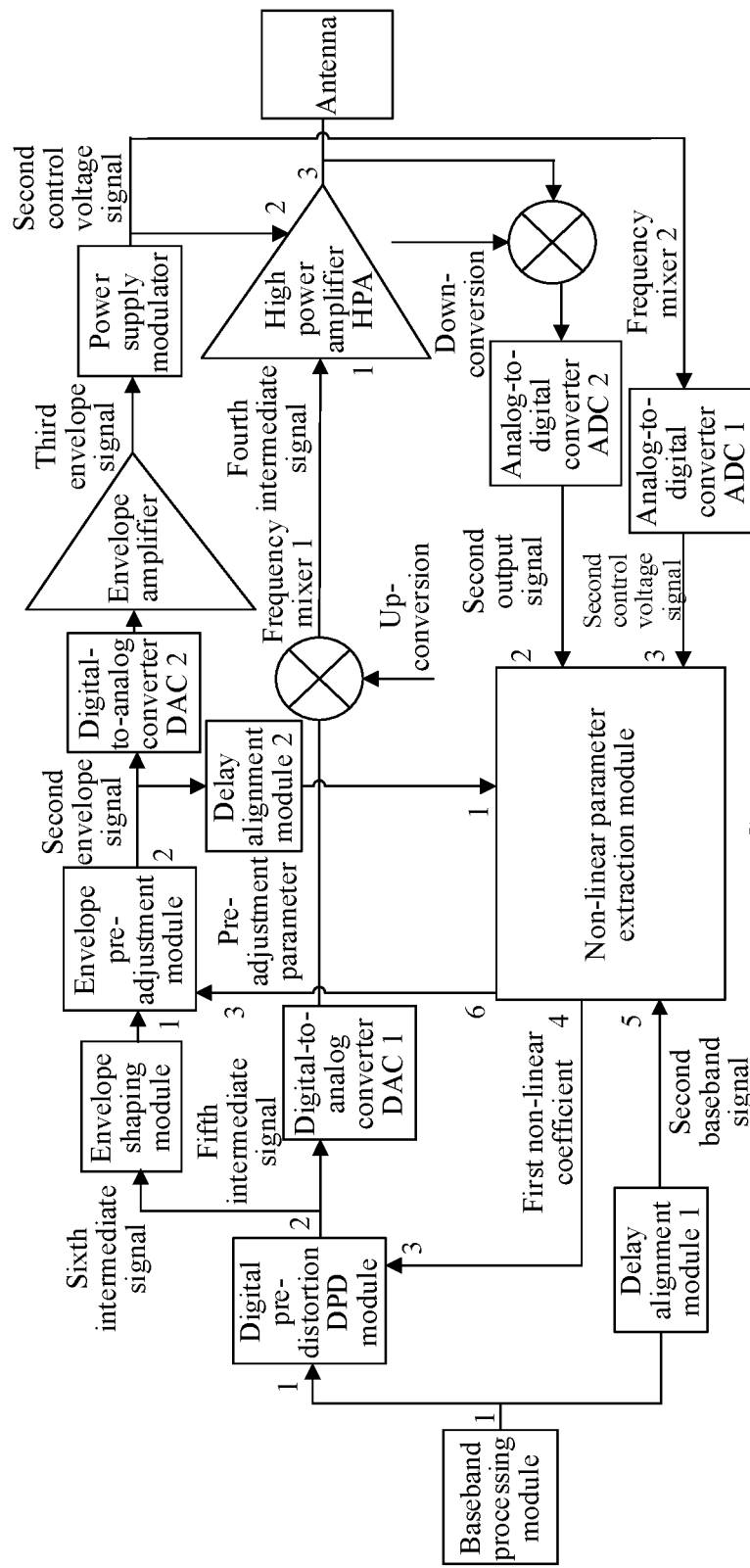
FIG. 7 is another schematic structural diagram of a signal processing apparatus according to an embodiment of this application.

For example, FIG. 7 is another schematic structural diagram of a signal processing apparatus according to an embodiment of this application. Compared with the schematic structural diagram shown in FIG. 5, the signal processing apparatus shown in FIG. 7 further includes an envelope pre-adjustment module. A first end of the envelope pre-adjustment module is connected to one end of the envelope shaping module, a second end of the envelope pre-adjustment module is connected to one end of the DAC 2 and one end of the delay alignment module 2, and a third end of the envelope adjustment module is connected to a sixth end of the non-linear parameter extraction module. The non-linear parameter extraction module receives the second baseband signal, the second output signal, the second envelope signal, and the second control voltage signal. The non-linear parameter extraction module determines the pre-adjustment parameter based on the second baseband signal, the second output signal, the second envelope signal, and the second control voltage signal, and inputs the pre-adjustment parameter into the envelope pre-adjustment module.

It should be noted that there is no fixed execution sequence between step S604 and step S601 to step S603. Step S604 may be performed first, and then step S601 to step S603 are performed. Alternatively, step S601 to step S603 are performed first, and then step S604 is performed. Alternatively, step S601 to step S603 and step S604 are simultaneously performed based on situations. This is not specifically limited in this application.

It should be noted that the signal processing apparatus shown in FIG. 7 is merely an example. In actual application, one end of the delay alignment module 2 may be connected to one end of the envelope shaping module, and another end of the delay alignment module 2 is connected to the first end of the envelope pre-adjustment module. The second end of the envelope pre-adjustment module may be connected to one end of the DAC 2. This is not specifically limited in this application.

S605: The signal processing apparatus performs envelope shaping processing on the second intermediate signal, to obtain the fifth envelope signal.

Figure 8:
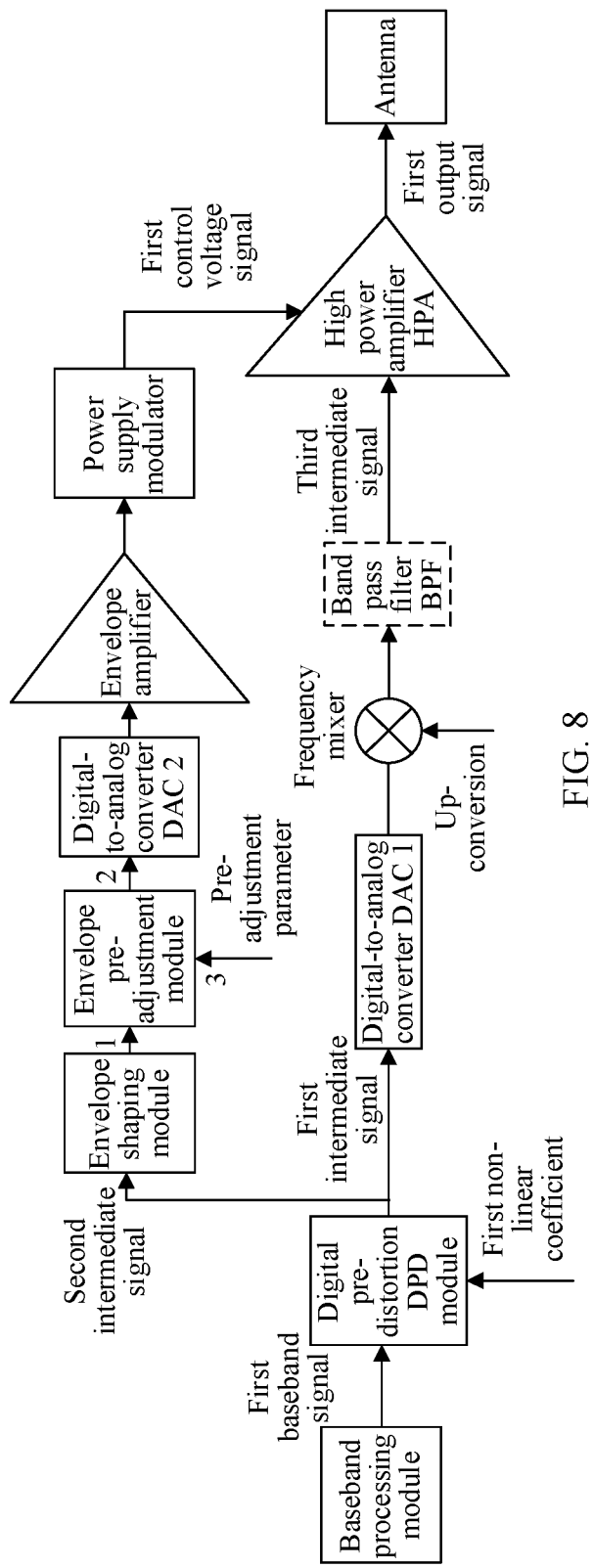
FIG. 8 is another schematic structural diagram of a signal processing apparatus according to an embodiment of this application.

For example, FIG. 8 is a schematic diagram of another embodiment of a signal processing apparatus according to an embodiment of this application. Compared with the signal processing apparatus shown in FIG. 3, the signal processing apparatus further includes an envelope pre-adjustment module. A first end of the envelope pre-adjustment module is connected to one end of the envelope shaping module, and a second end of the envelope pre-adjustment module is connected to the DAC 2. The envelope shaping module performs the envelope shaping processing on the second intermediate signal, to obtain the fifth envelope signal.

Figure 9:
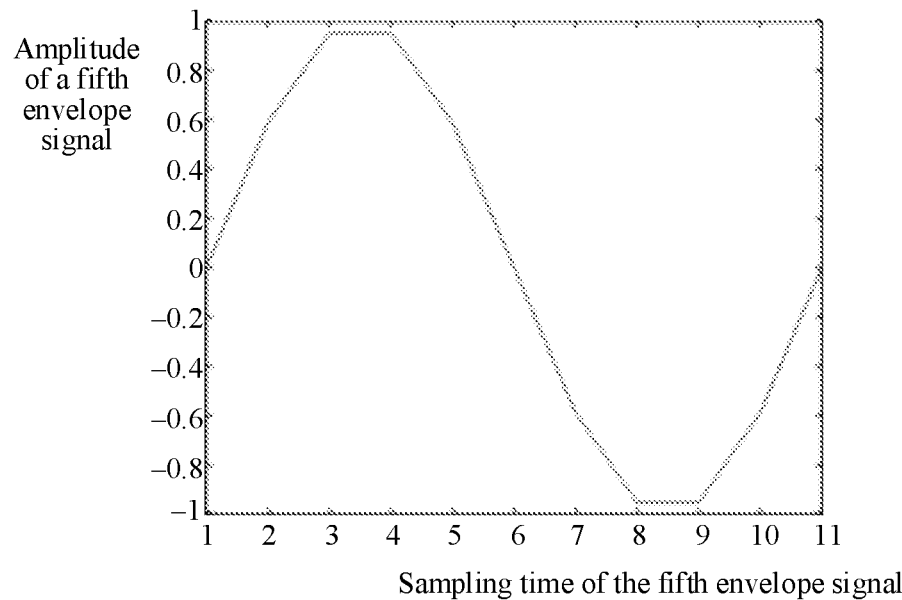
FIG. 9 is a schematic diagram of a waveform of a fifth envelope signal according to an embodiment of this application.

For example, FIG. 9 is a schematic diagram of the fifth envelope signal. In FIG. 9, a horizontal coordinate is a sampling time of the fifth envelope signal, and a vertical coordinate is an amplitude of the fifth envelope signal.

There is no fixed execution sequence between step S605, step S603, and step S604. Step S605 may be performed first, then step S603 is performed, and then step S604 is performed. Alternatively, step S603 is performed first, then step S604 is performed, and finally step S605 is performed. Alternatively, step S603 to step S605 are simultaneously performed based on situations. This is not specifically limited in this application.

S606: The signal processing apparatus performs pre-adjustment processing on the fifth envelope signal based on the pre-adjustment parameter, then performs digital-to-analog conversion processing, and then performs envelope amplification processing, to obtain the first envelope signal.

For example, the pre-adjustment parameter includes the coefficient of the filter. The signal processing apparatus performs pre-filtering processing on the fifth envelope signal based on the coefficient of the filter, to remove glitches of the fifth envelope signal. Then, the signal processing apparatus performs the digital-to-analog conversion processing on the fifth envelope signal obtained after the pre-adjustment processing and then performs the envelope amplification processing, to obtain the first envelope signal.

Figure 10:
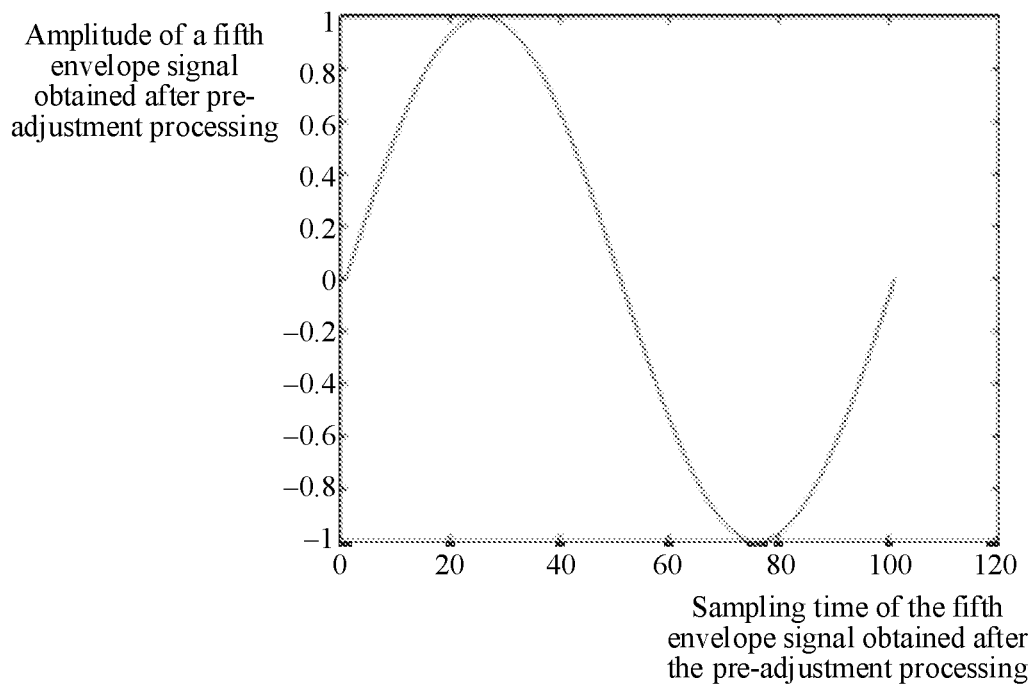
FIG. 10 is a schematic diagram of a waveform of a fifth envelope signal obtained after signal pre-adjustment processing according to an embodiment of this application.

For example, FIG. 10 is a schematic diagram of the fifth envelope signal obtained after pre-adjustment processing according to an embodiment of this application. Compared with the fifth envelope signal shown in FIG. 9, an envelope output of the fifth envelope signal obtained after the pre-adjustment processing is smoother. To be specific, secondary correction on the fifth envelope signal is implemented by performing the pre-adjustment processing in step S606.

The following describes the foregoing step S606 with reference to FIG. 8. The envelope shaping module performs envelope shaping processing on the second envelope signal, to obtain the fifth envelope signal. A third end of the envelope pre-adjustment module obtains the pre-adjustment parameter. For the obtaining process, refer to the related descriptions of the foregoing step S604. The envelope pre-adjustment module performs the pre-adjustment processing on the fifth envelope signal based on the pre-adjustment parameter, to obtain the fifth envelope signal obtained after the pre-adjustment processing, and inputs, into the DAC 2, the fifth envelope signal obtained after the pre-adjustment processing. The DAC 2 performs the digital-to-analog conversion processing on the fifth envelope signal obtained after the pre-adjustment processing and then performs the envelope amplification processing by using the envelope amplifier, to obtain the first envelope signal.

Optionally, the embodiment shown in FIG. 6 further includes step S606a, and step S606a may be performed before step S606.

S606a: The signal processing apparatus determines whether the first parameter is greater than or equal to a second threshold. If the first parameter is greater than or equal to the second threshold, step S606 is performed. If the first parameter is not greater than or not equal to the second threshold, step S611 is performed.

For the first parameter, refer to the related descriptions in the foregoing step S2001. Details are not described herein again.

A factor for setting a value of the second threshold is similar to the factor for setting a value of the first threshold in step S206 in the embodiment shown in FIG. 2. For details, refer to the foregoing related descriptions. Details are not described herein again.

Figure 11:
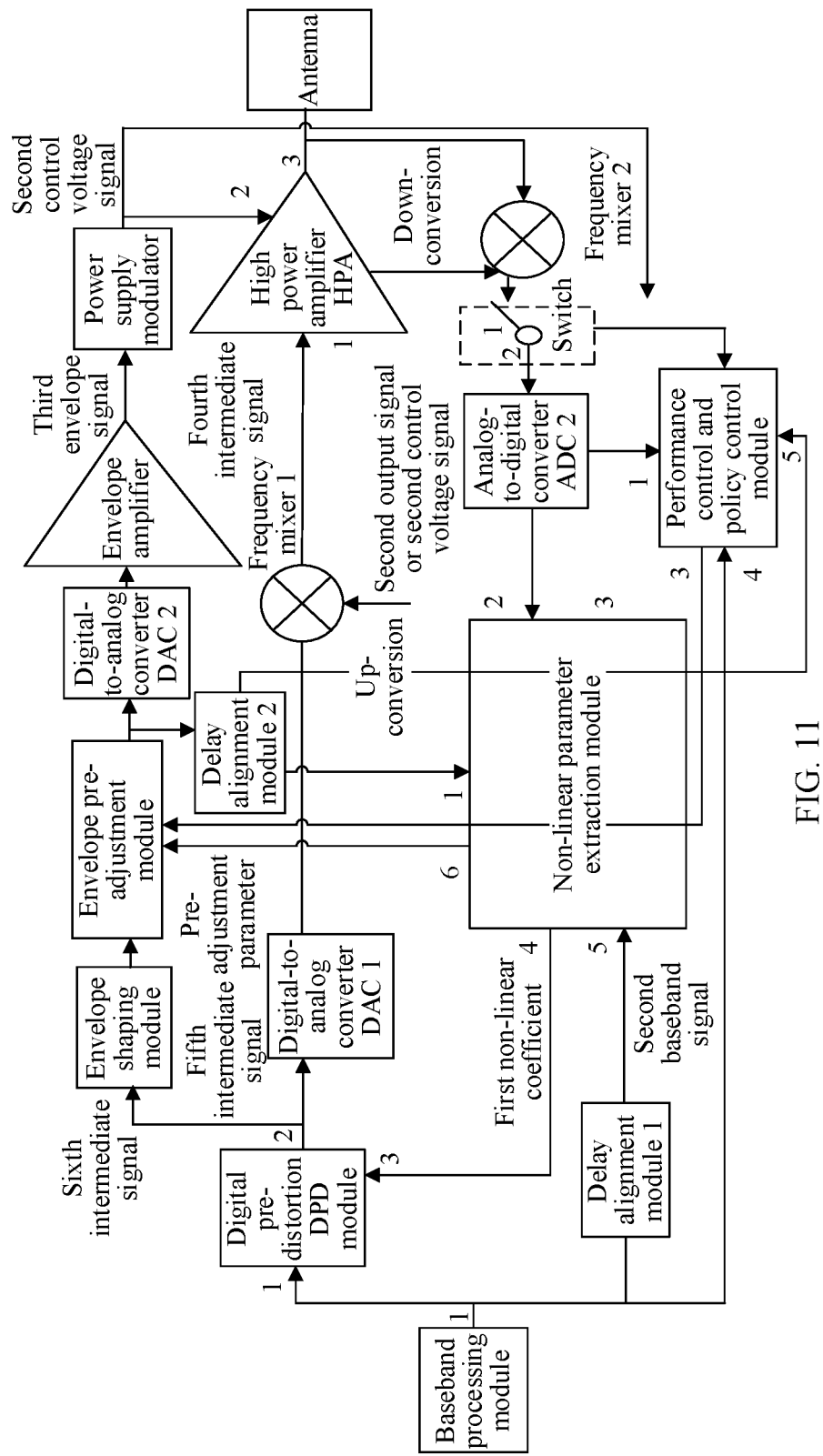
FIG. 11 is another schematic structural diagram of a signal processing apparatus according to an embodiment of this application.

For example, FIG. 11 is a schematic diagram of another embodiment of a signal processing apparatus according to an embodiment of this application. Refer to FIG. 11. The signal processing apparatus shown in FIG. 11 further includes a performance control and policy control module. A first end of the performance control and policy control module is connected to the ADC 2, and a second end of the performance control and policy control module is connected to a switch. A third end of the performance control and policy control module is connected to one end of the envelope pre-adjustment module, a fourth end of the performance control and policy control module is connected to the first end of the baseband processing module, and a fifth end of the performance control and policy control module is connected to one end of the delay alignment module 2.

The performance control and policy control module is configured to control a first end of the switch to be connected to one end of the frequency mixer 2, or control the first end of the switch to be connected to one end of the power supply modulator, to control an input signal of the ADC 2. For example, as shown in FIG. 11, the switch is connected to one end of the frequency mixer 2. In this case, the second output signal is input into the ADC 2. The switch is connected to one end of the power supply modulator. In this case, the second control voltage signal is input into the ADC 2.

The performance control and policy control module determines a minimum value of the first parameter in the manner of step S2001. The performance control and policy control module determines whether the first parameter is greater than or equal to the second threshold. If the first parameter is greater than or equal to the second threshold, the performance control and policy control module may send an indication to the envelope pre-adjustment module, to indicate the envelope pre-adjustment module to pre-adjust the fifth envelope signal based on the pre-adjustment parameter, that is, to perform step S606. If the first parameter is less than the second threshold, the performance control and policy control module may send an indication to the envelope pre-adjustment module, to indicate the envelope pre-adjustment module not to perform a pre-adjustment operation. To be specific, the envelope pre-adjustment module does not process the fifth envelope signal, that is, the envelope pre-adjustment module inputs the fifth envelope signal into the DAC 2 to perform step S611. For example, when the performance control and policy control module indicates a bit "1" to the envelope pre-adjustment module, the envelope pre-adjustment module pre-adjusts the fifth envelope signal based on the pre-adjustment parameter. When the performance control and policy control module indicates a bit "0" to the envelope pre-adjustment module, the envelope pre-adjustment module does not perform any processing on the fifth envelope signal, and directly inputs the fifth envelope signal into the DAC 2.

S607: The signal processing apparatus performs the digital-to-analog conversion processing on the fifth envelope signal obtained after the pre-adjustment processing and then performs the envelope amplification processing, to obtain the first envelope signal.

For example, as shown in FIG. 11, the DAC 2 performs the digital-to-analog conversion processing on the fifth envelope signal obtained after the pre-adjustment processing and then performs the envelope amplification processing by using the envelope amplifier, to obtain the first envelope signal. The envelope amplifier inputs the first envelope signal into the power supply modulator.

S608: The signal processing apparatus modulates the first envelope signal by using the power supply modulator, to obtain a first control voltage signal.

S609: The signal processing apparatus inputs the third intermediate signal and the first control voltage signal into the power amplifier, to obtain a first output signal.

Step S608 and step S609 are similar to step S205 and step S206 in the embodiment shown in FIG. 2. For details, refer to related descriptions of step S205 and step S206 in the embodiment shown in FIG. 2. Details are not described herein again.

Optionally, the embodiment shown in FIG. 6 further includes step S610. Step S610 is performed after step S609.

S610: The signal processing apparatus sends the first output signal.

Step S610 is similar to step S207 in the embodiment shown in FIG. 2. For details, refer to related descriptions of step S207 in the embodiment shown in FIG. 2. Details are not described herein again.

S611: The signal processing apparatus performs the digital-to-analog conversion processing on the fifth envelope signal and then performs the envelope amplification processing, to obtain the first envelope signal.

S612: The signal processing apparatus modulates the first envelope signal by using the power supply modulator, to obtain the first control voltage signal.

S613: The signal processing apparatus inputs the third intermediate signal and the first control voltage signal into the power amplifier, to obtain the first output signal.

Step S612 and step S613 are similar to step S205 and step S206 in the embodiment shown in FIG. 2. For details, refer to related descriptions of step S205 and step S206 in the embodiment shown in FIG. 2. Details are not described herein again.

Optionally, the embodiment shown in FIG. 6 further includes step S614. Step S614 is performed after step S613.

S614: The signal processing apparatus sends the first output signal.

Step S614 is similar to step S207 in the embodiment shown in FIG. 2. For details, refer to related descriptions of step S207 in the embodiment shown in FIG. 2. Details are not described herein again.

It should be noted that, as shown in FIG. 11, the performance control and policy control module is configured to control the first end of the switch to be connected to one end of the frequency mixer 2, or control the first end of the switch to be connected to one end of the power supply modulator, to control the input signal of the ADC 2. Compared with the signal processing apparatus shown in FIG. 7, the signal processing apparatus shown in FIG. 11 can implement the same function by using one ADC, to reduce costs of the signal processing apparatus.

Generally, a ratio of a time in which the first end of the switch is connected to one end of the frequency mixer 2 to a time in which the first end of the switch is connected to one end of the power supply modulator may be 1:1. The performance control and policy control module may control, by monitoring a change of the first parameter, a specific component to which the first end of the switch is connected. For example, when the first parameter is greater than or equal to the first threshold, the performance control and policy control module may increase the time in which the first end of the switch is connected to one end of the frequency mixer 2. Otherwise, the performance control and policy control module may increase the time in which the first end of the switch is connected to one end of the power supply modulator. The signal processing apparatus implements time-based sampling on the output signal and the control voltage signal by using the performance control and policy control module.

It should be noted that the structures of the signal processing apparatus shown above are merely some examples. The structure of the signal processing apparatus is not limited in embodiments of this application. For example, module division of the signal processing apparatus is not limited, and the foregoing is merely some examples of the signal processing apparatus. The foregoing modules may be implemented by using software, or may be implemented by using hardware, or may be implemented by using a combination of software and hardware. For example, the foregoing modules in a signal processing apparatus are implemented by using the hardware, and different modules and components may be integrated together, or may be separately deployed. This is not limited in this application.

Figure 12:
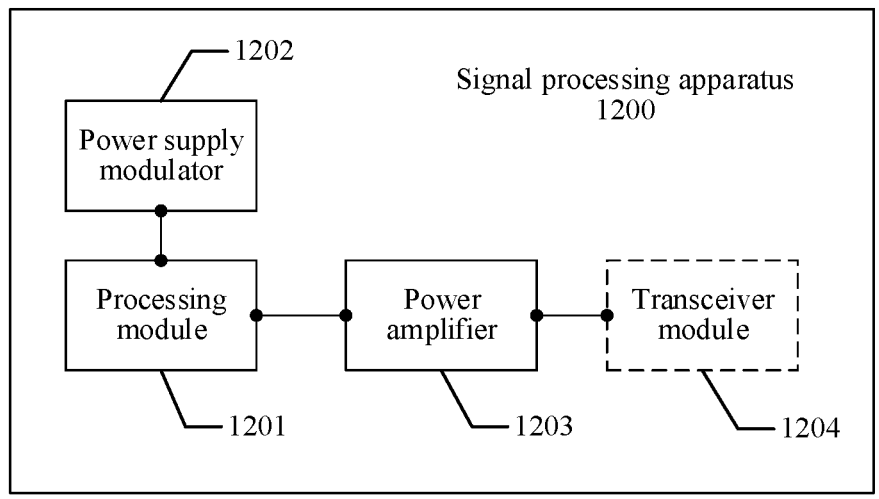
FIG. 12 is another schematic structural diagram of a signal processing apparatus according to an embodiment of this application.

The following describes a signal processing apparatus provided in embodiments of this application. FIG. 12 is a schematic structural diagram of a signal processing apparatus according to an embodiment of this application. A signal processing apparatus 1200 may be configured to perform steps performed by the signal processing apparatus in the embodiments shown in FIG. 2 and FIG. 6. For details, refer to related descriptions in the foregoing method embodiments.

The signal processing apparatus 1200 includes a processing module 1201, a power supply modulator 1202, and a power amplifier 1203. Optionally, the signal processing apparatus 1200 further includes a transceiver module 1204.

The processing module 1201 is configured to: obtain a first non-linear coefficient, where the first non-linear coefficient indicates a non-linear characteristic of the power amplifier 1203 and a non-linear characteristic of the power supply modulator 1202; perform non-linear preprocessing and correction on a first baseband signal based on the first non-linear coefficient, to obtain a first intermediate signal and a second intermediate signal; perform digital-to-analog conversion on the first intermediate signal and then performing up-conversion processing, to obtain a third intermediate signal; perform envelope processing on the second intermediate signal, to obtain a first envelope signal; modulate the first envelope signal by using the power supply modulator 1202, to obtain a first control voltage signal; and input the third intermediate signal and the first control voltage signal into the power amplifier 1203, to obtain a first output signal.

In a possible implementation, the first non-linear coefficient indicates a first non-linear characteristic of the power amplifier 1203 in a first working state and a second non-linear characteristic of the power supply modulator 1202 in a second working state.

The processing module 1201 modulates the first envelope signal by using the power supply modulator 1202, to obtain a first control voltage signal, to enable the power supply modulator 1202 to be in a third working state. The processing module 1201 inputs the third intermediate signal and the first control voltage signal into the power amplifier 1203, to obtain the first output signal, to enable the power amplifier 1203 to be in a fourth working state.

An error between a total non-linear characteristic of a third non-linear characteristic of the power supply modulator 1202 in the third working state and a fourth non-linear characteristic of the power amplifier 1203 in the fourth working state and a total non-linear characteristic of the first non-linear characteristic and the second non-linear characteristic that is indicated by the first non-linear coefficient is less than or equal to a first threshold.

In another possible implementation, the processing module 1201 is specifically configured to:
determine the first non-linear coefficient based on a second baseband signal, a second output signal, a second envelope signal, and a second control voltage signal.

The second output signal is a signal obtained by inputting a fourth intermediate signal and the second control voltage signal into the power amplifier 1203, to enable the power amplifier 1203 to be in the first working state.

The fourth intermediate signal is obtained by performing the digital-to-analog conversion on a fifth intermediate signal and then performing the up-conversion processing.

The second envelope signal is a signal obtained by performing envelope shaping processing on a sixth intermediate signal.

The second control voltage signal is a signal obtained by modulating a third envelope signal by using the power supply modulator 1202, where the power supply modulator 1202 is in the second working state, and the third envelope signal is a signal obtained by performing analog-to-digital conversion on the second envelope signal and then envelope amplification processing.

The fifth intermediate signal and the sixth intermediate signal each are an intermediate signal obtained by performing the preprocessing and correction on the second baseband signal based on a second non-linear coefficient, where the second non-linear coefficient indicates a fifth non-linear characteristic of the power amplifier 1203 in a fifth working state and a sixth non-linear characteristic of the power supply modulator 1202 in a sixth working state.

In another possible implementation, the processing module 1201 is further configured to:
obtain a pre-adjustment parameter.
The processing module 1201 is configured to
perform the envelope shaping processing on the second intermediate signal, to obtain a fifth envelope signal; and
perform pre-adjustment processing on the fifth envelope signal based on the pre-adjustment parameter, then perform digital-to-analog conversion processing, and then perform the envelope amplification processing, to obtain the first envelope signal.

In another possible implementation, the processing module 1201 is specifically configured to:
determine the pre-adjustment parameter based on the second baseband signal, the second output signal, the second envelope signal, and the second control voltage signal.

The second output signal is the signal obtained by inputting the fourth intermediate signal and the second control voltage signal into the power amplifier 1203, to enable the power amplifier 1203 to be in the first working state.

The fourth intermediate signal is obtained by performing the digital-to-analog conversion on the fifth intermediate signal and then performing the up-conversion processing.

The second envelope signal is the signal obtained by performing the envelope shaping processing on the sixth intermediate signal.

The second control voltage signal is the signal obtained by modulating the third envelope signal by using the power supply modulator 1202, where the power supply modulator 1202 is in the second working state, and the third envelope signal is the signal obtained by performing the analog-to-digital conversion on the second envelope signal and then performing the envelope amplification processing.

The fifth intermediate signal and the sixth intermediate signal each are intermediate signals obtained by performing the preprocessing and correction on the second baseband signal based on the second non-linear coefficient, where the second non-linear coefficient indicates the fifth non-linear characteristic of the power amplifier 1203 in the fifth working state and the sixth non-linear characteristic of the power supply modulator 1202 in the sixth working state.

In another possible implementation, the processing module 1201 is further configured to:
determine that a first parameter is greater than a second threshold, where the first parameter is obtained based on the second baseband signal, the second output signal, the second envelope signal, and the second control voltage signal.

In another possible implementation, the processing module 1201 is further configured to:
determine a first delay value and a second delay value; and
simultaneously obtain the second baseband signal and the second output signal based on the first delay value, and simultaneously obtain the third envelope signal and the second control voltage signal based on the second delay value.

In another possible implementation, the transceiver module 1204 is further configured to:
send the first output signal.

In this embodiment of this application, the processing module 1201 obtains the first non-linear coefficient, where the first non-linear coefficient indicates the non-linear characteristic of the power amplifier 1203 and the non-linear characteristic of the power supply modulator 1202. The processing module 1201 performs the preprocessing and correction on the first baseband signal based on the first non-linear coefficient, to obtain the first intermediate signal and the second intermediate signal. The processing module 1201 performs the digital-to-analog conversion on the first intermediate signal and then performs the up-conversion processing, to obtain the third intermediate signal. The processing module 1201 performs the envelope processing on the second intermediate signal, to obtain the first envelope signal. The processing module 1201 modulates the first envelope signal by using the power supply modulator, to obtain the first control voltage signal. The processing module 1201 inputs the third intermediate signal and the first control voltage signal into the power amplifier, to obtain the first output signal. It can be learned that, in this application, the processing module 1201 obtains the first non-linear coefficient, and performs the preprocessing and correction on the first baseband signal based on the first non-linear coefficient. The first non-linear coefficient indicates the non-linear characteristic of the power amplifier 1203 and the non-linear characteristic of the power supply modulator 1202. The processing module 1201 compensates, in a signal processing process, for non-linear distortion of a signal that is caused by the non-linear characteristic of the power amplifier 1203 and the non-linear characteristic of the power supply modulator 1202, to enable the power amplifier 1203 to operate in a non-linear region. This improves the efficiency of the power amplifier.

Optionally, the signal processing apparatus shown in FIG. 12 may be a chip. The transceiver module 1204 in the chip may be an input/output circuit or a communication interface.

The processing module 1201 in the chip is a processor, a microprocessor, an integrated circuit, or a logic circuit integrated in the chip.

Figure 13:
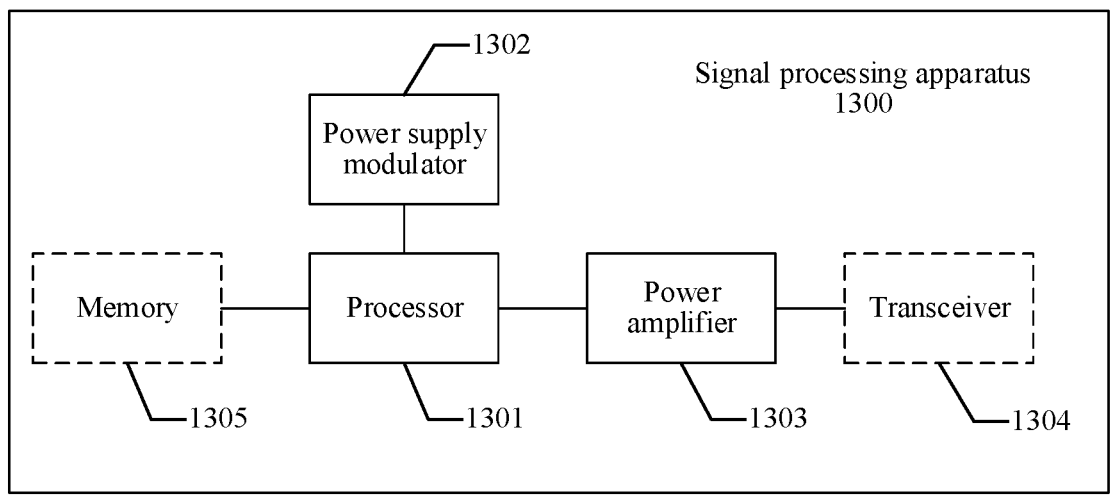
FIG. 13 is another schematic structural diagram of a signal processing apparatus according to an embodiment of this application.

This application further provides a signal processing apparatus. FIG. 13 is another schematic structural diagram of a signal processing apparatus according to an embodiment of this application. Refer to FIG. 13. A signal processing apparatus 1300 may perform steps performed by the signal processing apparatus in the embodiments shown in FIG. 2 and FIG. 6. For details, refer to related descriptions in the foregoing method embodiments.

The signal processing apparatus 1300 includes a processor 1301, a power supply modulator 1302, and a power amplifier 1303. The processor 1301 is coupled to a memory 1305. The memory 1305 is configured to store a computer program (or computer instructions) and/or data. The processor 1301 is configured to execute the computer program (or the computer instructions) and/or the data stored in the memory 1305, so that the methods in the foregoing method embodiments are performed.

Optionally, the signal processing apparatus 1300 includes one or more processors 1301.

Optionally, the signal processing apparatus 1300 may further include the memory 1305.

Optionally, the signal processing apparatus 1300 includes one or more memories 1305.

Optionally, the memory 1305 may be integrated with the processor 1301, or may be disposed separately.

Optionally, as shown in FIG. 13, the signal processing apparatus 1300 further includes a transceiver 1304. The transceiver 1304 is configured to receive and/or send a signal. For example, the processor 1301 is configured to control the transceiver 1304 to receive and/or send the signal.

For example, the processor 1301 is configured to implement a processing-related operation performed by the signal processing apparatus in the foregoing method embodiments, and the transceiver 1304 is configured to implement a receiving and sending-related operation performed by the signal processing apparatus in the foregoing method embodiments.

Figure 14:
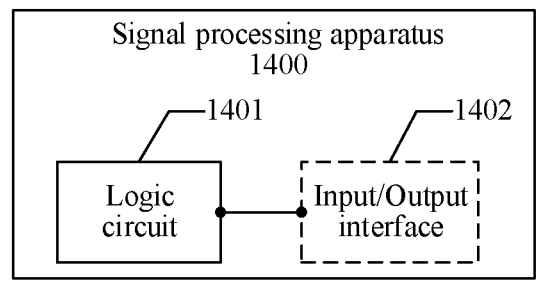
FIG. 14 is another schematic structural diagram of a signal processing apparatus according to an embodiment of this application.

FIG. 14 is another schematic structural diagram of a signal processing apparatus according to an embodiment of this application. Refer to FIG. 14. A signal processing apparatus 1400 includes a logic circuit 1401. The logic circuit 1401 includes a power amplifier and a power supply modulator. Optionally, the signal processing apparatus further includes an input/output interface 1402. The signal processing apparatus may be configured to perform the steps of the embodiments shown in FIG. 2 and FIG. 6.

Optionally, the input/output interface 1402 may have functions of the transceiver module 1204 in the embodiment shown in FIG. 12, and the logic circuit 1401 may have functions of the processing module 1201 in the embodiment shown in FIG. 12. The logic circuit 1401 may be configured to perform processing operations in the embodiments shown in FIG. 2 and FIG. 6, and the input/output interface 1402 may be configured to perform sending and receiving operations in the embodiments shown in FIG. 2 and FIG. 6.

The signal processing apparatus shown in FIG. 14 may perform the technical solutions shown in the foregoing method embodiments. An implementation principle and beneficial effects of the signal processing apparatus are similar to those of the foregoing method embodiments. Details are not described herein again.

Embodiments of this application further provide a computer program product including instructions. When the computer program product runs on a computer, the computer is enabled to perform the signal processing methods in the embodiments shown in FIG. 2 and FIG. 6.

Embodiments of this application further provide a computer-readable storage medium, including computer instructions. When the computer instructions are run on a computer, the computer is enabled to perform the signal processing methods in the embodiments shown in FIG. 2 and FIG. 6.

Embodiments of this application further provide a chip apparatus, including a processor, configured to connect to a memory and invoke a program stored in the memory, to enable the processor to perform the signal processing methods in the embodiments shown in FIG. 2 and FIG. 6.

The processor mentioned in any one of the foregoing may be a general-purpose central processing unit, a microprocessor, an application-specific integrated circuit (ASIC), or one or more integrated circuits configured to control program execution of the signal processing methods in the embodiments shown in FIG. 2 and FIG. 6. The memory mentioned above may be a read-only memory (ROM), another type of static storage device that can store static information and instructions, a random access memory (RAM), or the like.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other ways. For example, the described apparatus embodiment is merely an example. For example, division into the units is merely logical function division and there may be other divisions made during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in an electronic form, a mechanical form, or another form.

The units described as separate parts may or may not be physically separate, and the parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, an optical disc, or the like.

In conclusion, the foregoing embodiments are merely intended for describing the technical solutions of this application, but not for limiting this application. Although this application is described in detail with reference to the foregoing embodiments, a person of ordinary skill in the art should understand that the technical solutions described in the foregoing embodiments may still be modified, or some technical features thereof may be equivalently replaced. These modifications or replacements do not make the essence of the corresponding technical solutions fall outside the scope of the technical solutions of the embodiments of this application.

What is claimed is:

1. A signal processing method applied to a signal processing apparatus comprising a power amplifier and a power supply modulator, the method comprising:
obtaining a first non-linear coefficient that indicates a non-linear characteristic of the power amplifier and a non-linear characteristic of the power supply modulator;
performing non-linear preprocessing and correction on a first baseband signal based on the first non-linear coefficient to obtain a first intermediate signal and a second intermediate signal;
performing digital-to-analog conversion on the first intermediate signal and then performing up-conversion processing to obtain a third intermediate signal;
performing envelope processing on the second intermediate signal to obtain a first envelope signal;
modulating the first envelope signal by utilizing the power supply modulator to obtain a first control voltage signal; and
inputting the third intermediate signal and the first control voltage signal into the power amplifier to obtain a first output signal.

2. The method according to claim 1, wherein the first non-linear coefficient indicates a first non-linear characteristic of the power amplifier in a first working state and a second non-linear characteristic of the power supply modulator in a second working state; and
wherein the method further comprises:
modulating the first envelope signal by utilizing the power supply modulator to obtain the first control voltage signal to enable the power supply modulator to be in a third working state; and inputting the third intermediate signal and the first control voltage signal into the power amplifier to obtain the first output sign alto enable the power amplifier to be in a fourth working state; wherein
an error between a total non-linear characteristic of a third non-linear characteristic of the power supply modulator in the third working state and a fourth non-linear characteristic of the power amplifier in the fourth working state and a total non-linear characteristic of the first non-linear characteristic and the second non-linear characteristic that is indicated by the first non-linear coefficient is less than or equal to a first threshold.

3. The method according to claim 1, wherein the obtaining of the first non-linear coefficient comprises:

determining the first non-linear coefficient based on a second baseband signal, a second output signal, a second envelope signal, and a second control voltage signal, wherein the second output signal is obtained by inputting a fourth intermediate signal and the second control voltage signal into the power amplifier to enable the power amplifier to be in a first working state;

the fourth intermediate signal is obtained by performing the digital-to-analog conversion on a fifth intermediate signal and then performing the up-conversion processing;

the second envelope signal is obtained by performing envelope shaping processing on a sixth intermediate signal;

the second control voltage signal is obtained by modulating a third envelope signal by utilizing the power supply modulator, wherein the power supply modulator is in a second working state, and the third envelope signal is obtained by performing analog-to-digital conversion on the second envelope signal and then performing envelope amplification processing; and the fifth intermediate signal and the sixth intermediate signal each are an intermediate signal obtained by performing the preprocessing and correction on the second baseband signal based on a second non-linear coefficient, wherein the second non-linear coefficient indicates a fifth non-linear characteristic of the power amplifier in a fifth working state and a sixth non-linear characteristic of the power supply modulator in a sixth working state.

4. The method according to claim 1, wherein the method further comprises:

obtaining a pre-adjustment parameter; and the performing of the envelope processing on the second intermediate signal comprises:

performing envelope shaping processing on the second intermediate signal to obtain a fifth envelope signal; and performing pre-adjustment processing on the fifth envelope signal based on the pre-adjustment parameter, then performing digital-to-analog conversion processing on the fifth envelope signal, and then performing envelope amplification processing to obtain the first envelope signal.

5. The method according to claim 4, wherein the obtaining of the pre-adjustment parameter comprises:

determining the pre-adjustment parameter based on a second baseband signal, a second output signal, a second envelope signal, and a second control voltage signal, wherein the second output signal is obtained by inputting a fourth intermediate signal and the second control voltage signal into the power amplifier to enable the power amplifier to be in a first working state;

the fourth intermediate signal is obtained by performing the digital-to-analog conversion on a fifth intermediate signal and then performing the up-conversion processing;

the second envelope signal is obtained by performing the envelope shaping processing on a sixth intermediate signal;

the second control voltage signal is obtained by modulating a third envelope signal by utilizing the power supply modulator, wherein the power supply modulator is in a second working state, and the third envelope signal is obtained by performing the analog-to-digital conversion on the second envelope signal and then performing the envelope amplification processing; and the fifth intermediate signal and the sixth intermediate signal each are intermediate signals obtained by performing the preprocessing and correction on the second baseband signal based on a second non-linear coefficient, wherein the second non-linear coefficient indicates a fifth non-linear characteristic of the power amplifier in a fifth working state and a sixth non-linear characteristic of the power supply modulator in a sixth working state.

6. The method according to claim 4, wherein before performing the pre-adjustment processing on the fifth envelope signal based on the pre-adjustment parameter the method further comprises:

determining that a first parameter is greater than a second threshold, wherein the first parameter is obtained based on a second baseband signal, a second output signal, a second envelope signal, and a second control voltage signal.

7. The method according to claim 3, wherein the method further comprises:

determining a first delay value and a second delay value; and simultaneously obtaining, by the signal processing apparatus, the second baseband signal and the second output signal based on the first delay value, and simultaneously obtaining the third envelope signal and the second control voltage signal based on the second delay value.

8. A signal processing apparatus comprising:

a power amplifier, a power supply modulator, and a processing circuit configured to:

obtain a first non-linear coefficient that indicates a non-linear characteristic of the power amplifier and a non-linear characteristic of the power supply modulator;

perform non-linear preprocessing and correction on a first baseband signal based on the first non-linear coefficient to obtain a first intermediate signal and a second intermediate signal;

perform digital-to-analog conversion on the first intermediate signal and then perform up-conversion processing to obtain a third intermediate signal;

perform envelope processing on the second intermediate signal to obtain a first envelope signal;

modulate the first envelope signal by utilizing the power supply modulator to obtain a first control voltage signal; and input the third intermediate signal and the first control voltage signal into the power amplifier to obtain a first output signal.

9. The signal processing apparatus according to claim 8, wherein the first non-linear coefficient indicates a first non-linear characteristic of the power amplifier in a first working state and a second non-linear characteristic of the power supply modulator in a second working state; and wherein the processing circuit is configured to:

modulate the first envelope signal, by utilizing the power supply modulator, to obtain the first control voltage signal to enable the power supply modulator to be in a third working state; and input the third intermediate signal and the first control voltage signal into the power amplifier to obtain the first output signal to enable the power amplifier to be in a fourth working state; wherein an error between a total non-linear characteristic of a third non-linear characteristic of the power supply modulator in the third working state and a fourth non-linear characteristic of the power amplifier in the fourth working state and a total non-linear characteristic of the first non-linear characteristic and the second non-linear characteristic that is indicated by the first non-linear coefficient is less than or equal to a first threshold.

10. The signal processing apparatus according to claim 8, wherein the processing circuit is configured to:
determine the first non-linear coefficient based on a second baseband signal, a second output signal, a second envelope signal, and a second control voltage signal, wherein
the second output signal is obtained by inputting a fourth intermediate signal and the second control voltage signal into the power amplifier to enable the power amplifier to be in a first working state;
the fourth intermediate signal is obtained by performing the digital-to-analog conversion on a fifth intermediate signal and then performing the up-conversion processing;
the second envelope signal is obtained by performing envelope shaping processing on a sixth intermediate signal;
the second control voltage signal is obtained by modulating a third envelope signal by utilizing the power supply modulator, wherein the power supply modulator is in a second working state, and the third envelope signal is obtained by performing analog-to-digital conversion on the second envelope signal and then performing envelope amplification processing; and
the fifth intermediate signal and the sixth intermediate signal each are an intermediate signal obtained by performing the preprocessing and correction on the second baseband signal based on a second non-linear coefficient, wherein the second non-linear coefficient indicates a fifth non-linear characteristic of the power amplifier in a fifth working state and a sixth non-linear characteristic of the power supply modulator in a sixth working state.

11. The signal processing apparatus according to claim 8, wherein the processing circuit is configured to:
obtain a pre-adjustment parameter, wherein
the processing circuit is further configured to:
perform envelope shaping processing on the second intermediate signal to obtain a fifth envelope signal; and
perform pre-adjustment processing on the fifth envelope signal based on the pre-adjustment parameter, then perform digital-to-analog conversion processing on the fifth envelope signal, and then perform envelope amplification processing to obtain the first envelope signal.

12. The signal processing apparatus according to claim 11, wherein the processing circuit is configured to:
determine the pre-adjustment parameter based on a second baseband signal, a second output signal, a second envelope signal, and a second control voltage signal, wherein
the second output signal is obtained by inputting a fourth intermediate signal and the second control voltage signal into the power amplifier to enable the power amplifier to be in a first working state;
the fourth intermediate signal is obtained by performing the digital-to-analog conversion on a fifth intermediate signal and then performing the up-conversion processing;
the second envelope signal is obtained by performing the envelope shaping processing on a sixth intermediate signal;
the second control voltage signal is obtained by modulating a third envelope signal by utilizing the power supply modulator, wherein the power supply modulator is in a second working state, and the third envelope signal is obtained by performing the analog-to-digital conversion on the second envelope signal and then performing the envelope amplification processing; and
the fifth intermediate signal and the sixth intermediate signal each are intermediate signals obtained by performing the preprocessing and correction on the second baseband signal based on a second non-linear coefficient, wherein the second non-linear coefficient indicates a fifth non-linear characteristic of the power amplifier in a fifth working state and a sixth non-linear characteristic of the power supply modulator in a sixth working state.

13. The signal processing apparatus according to claim 11, wherein the processing circuit is further configured to:
determine that a first parameter is greater than a second threshold, wherein the first parameter is obtained based on a second baseband signal, a second output signal, a second envelope signal, and a second control voltage signal.

14. The signal processing apparatus according to claim 10, wherein the processing circuit is further configured to:
determine a first delay value and a second delay value; and
simultaneously obtain the second baseband signal and the second output signal based on the first delay value, and simultaneously obtain the third envelope signal and the second control voltage signal based on the second delay value.

15. A communication apparatus, comprising:
at least one processor configured to perform operations comprising:
obtaining a first non-linear coefficient that indicates a non-linear characteristic of a power amplifier and a non-linear characteristic of a power supply modulator;
performing non-linear preprocessing and correction on a first baseband signal based on the first non-linear coefficient to obtain a first intermediate signal and a second intermediate signal;
performing digital-to-analog conversion on the first intermediate signal and then performing up-conversion processing to obtain a third intermediate signal;
performing envelope processing on the second intermediate signal to obtain a first envelope signal;
modulating the first envelope signal by utilizing the power supply modulator to obtain a first control voltage signal; and
inputting the third intermediate signal and the first control voltage signal into the power amplifier to obtain a first output signal.

16. The apparatus according to claim 15, wherein the first non-linear coefficient indicates a first non-linear characteristic of the power amplifier in a first working state and a second non-linear characteristic of the power supply modulator in a second working state;
and wherein the operations further comprise:
modulating the first envelope signal by utilizing the power supply modulator to obtain the first control voltage signal to enable the power supply modulator to be in a third working state; and inputting, the third intermediate signal and the first control voltage signal into the power amplifier, to obtain the first output signal, to enable the power amplifier to be in a fourth working state; wherein an error between a total non-linear characteristic of a third non-linear characteristic of the power supply modulator in the third working state and a fourth non-linear characteristic of the power amplifier in the fourth working state and a total non-linear characteristic of the first non-linear characteristic and the second non-linear characteristic that is indicated by the first non-linear coefficient is less than or equal to a first threshold.

17. The apparatus according to claim 15, wherein the obtaining of the first non-linear coefficient comprises:
determining the first non-linear coefficient based on a second baseband signal, a second output signal, a second envelope signal, and a second control voltage signal, wherein
the second output signal is obtained by inputting a fourth intermediate signal and the second control voltage signal into the power amplifier to enable the power amplifier to be in a first working state;
the fourth intermediate signal is obtained by performing the digital-to-analog conversion on a fifth intermediate signal and then performing the up-conversion processing;
the second envelope signal is obtained by performing envelope shaping processing on a sixth intermediate signal;
the second control voltage signal is obtained by modulating a third envelope signal by utilizing the power supply modulator, wherein the power supply modulator is in a second working state, and the third envelope signal is obtained by performing analog-to-digital conversion on the second envelope signal and then performing envelope amplification processing; and
the fifth intermediate signal and the sixth intermediate signal each are intermediate signals obtained by performing the preprocessing and correction on the second baseband signal based on a second non-linear coefficient, wherein the second non-linear coefficient indicates a fifth non-linear characteristic of the power amplifier in a fifth working state and a sixth non-linear characteristic of the power supply modulator in a sixth working state.

18. The apparatus according to claim 15, wherein the operations further comprise:
obtaining a pre-adjustment parameter; and
the performing of the envelope processing on the second intermediate signal comprises:
performing envelope shaping processing on the second intermediate signal to obtain a fifth envelope signal; and
performing pre-adjustment processing on the fifth envelope signal based on the pre-adjustment parameter, then performing digital-to-analog conversion processing on the fifth envelope signal, and then performing envelope amplification processing, to obtain the first envelope signal.

19. The apparatus according to claim 18, wherein the obtaining of the pre-adjustment parameter comprises:
determining the pre-adjustment parameter based on a second baseband signal, a second output signal, a second envelope signal, and a second control voltage signal, wherein
the second output signal is obtained by inputting a fourth intermediate signal and the second control voltage signal into the power amplifier to enable the power amplifier to be in a first working state;
the fourth intermediate signal is obtained by performing the digital-to-analog conversion on a fifth intermediate signal and then performing the up-conversion processing;
the second envelope signal is obtained by performing the envelope shaping processing on a sixth intermediate signal;
the second control voltage signal is obtained by modulating a third envelope signal by utilizing the power supply modulator, wherein the power supply modulator is in a second working state, and the third envelope signal is obtained by performing the analog-to-digital conversion on the second envelope signal and then performing the envelope amplification processing; and
the fifth intermediate signal and the sixth intermediate signal each are intermediate signals obtained by performing the preprocessing and correction on the second baseband signal based on a second non-linear coefficient, wherein the second non-linear coefficient indicates a fifth non-linear characteristic of the power amplifier in a fifth working state and a sixth non-linear characteristic of the power supply modulator in a sixth working state.

20. The apparatus according to claim 18, wherein before performing the pre-adjustment processing on the fifth envelope signal based on the pre-adjustment parameter the operations further comprise:
determining that a first parameter is greater than a second threshold, wherein the first parameter is obtained based on a second baseband signal, a second output signal, a second envelope signal, and a second control voltage signal.

* * * * *